(12) United States Patent
Alvarez Virtoli et al.

(10) Patent No.: US 10,820,747 B2
(45) Date of Patent: Nov. 3, 2020

(54) BEVERAGE DISPENSING UNIT AND APPARATUS COMPRISING SAID DISPENSING UNIT

(71) Applicant: CAFFITALY SYSTEM S.P.A., Gaggio Montano (BO) (IT)

(72) Inventors: Italo Andrea Alvarez Virtoli, Rubiera (IT); Sergio Zappella, Gentilino (CH)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 258 days.

(21) Appl. No.: 15/769,159

(22) PCT Filed: Oct. 7, 2016

(86) PCT No.: PCT/IB2016/056024
§ 371 (c)(1),
(2) Date: Apr. 18, 2018

(87) PCT Pub. No.: WO2017/068449
PCT Pub. Date: Apr. 27, 2017

(65) Prior Publication Data
US 2018/0303282 A1 Oct. 25, 2018

(30) Foreign Application Priority Data

Oct. 19, 2015 (IT) .......................... 102015000063023
Oct. 19, 2015 (IT) .......................... 102015000063037
Oct. 19, 2015 (IT) .......................... 102015000063076

(51) Int. Cl.
*A47J 31/46* (2006.01)
*A47J 31/44* (2006.01)
*A47J 31/06* (2006.01)

(52) U.S. Cl.
CPC ........... *A47J 31/46* (2013.01); *A47J 31/0668* (2013.01); *A47J 31/4407* (2013.01)

(58) Field of Classification Search
CPC .... A47J 31/46; A47J 31/4407; A47J 31/0668; A47J 31/4403
See application file for complete search history.

(56) References Cited

U.S. PATENT DOCUMENTS 5,657,683 A * 8/1997 Sandei ................ A47J 31/3609
99/287
6,129,006 A * 10/2000 Schmed .............. A47J 31/3609
99/287

(Continued)

FOREIGN PATENT DOCUMENTS

| CN | 102028412 A | 4/2011 |
| EP | 1800577 A1 | 6/2007 |

(Continued)

*Primary Examiner* — John C Hong
(74) *Attorney, Agent, or Firm* — Pearne & Gordon LLP

(57) ABSTRACT

A beverage dispensing unit (1; 13; 15; 17) for an apparatus for supplying a beverage (in particular, coffee) which comprises an infeed section (21) and a dispensing section (23), which comprises three dispensing spouts (31, 32, 33). Two ducts (41, 42) are interposed in parallel between the infeed section and the dispensing section. Each duct receives a respective part of the beverage and has an outfeed (44). A movable member (5; 53; 7) is shiftable to change a liquid transfer path between the outfeeds of the two ducts and the dispensing section: when the movable member is in a first position, the respective parts of beverage are introduced into a same first dispensing spout (31); when the movable member is in a second position, the respective part of beverage of one duct (41) is introduced into a second dispensing spout (32) and the respective part of beverage of the other duct (42) is introduced into a third dispensing spout (33).

39 Claims, 15 Drawing Sheets

(56) References Cited

U.S. PATENT DOCUMENTS

| | | |
|---|---|---|
| 9,560,930 B2 * | 2/2017 | Fin .................... A47J 31/3638 |
| 2006/0045942 A1 | 3/2006 | Sher et al. |
| 2006/0174778 A1 | 8/2006 | Greiwe |
| 2008/0093382 A1 | 4/2008 | Sher et al. |
| 2010/0212508 A1 | 8/2010 | Buttiker |
| 2010/0224075 A1 | 9/2010 | Anliker |
| 2013/0075432 A1 | 3/2013 | Staveris |
| 2014/0020566 A1 | 1/2014 | Stieger |
| 2014/0137749 A1 | 5/2014 | Marchi et al. |
| 2015/0047742 A1 | 2/2015 | Baldo |
| 2015/0251209 A1 | 9/2015 | Thompson et al. |
| 2015/0342396 A1 | 12/2015 | De Longhi et al. |
| 2017/0000290 A1 | 1/2017 | Van Der Woning et al. |

FOREIGN PATENT DOCUMENTS

| | | |
|---|---|---|
| GB | 147559 A | 6/1921 |
| WO | 2014/032208 A1 | 3/2014 |
| WO | 2014086602 A1 | 6/2014 |

* cited by examiner

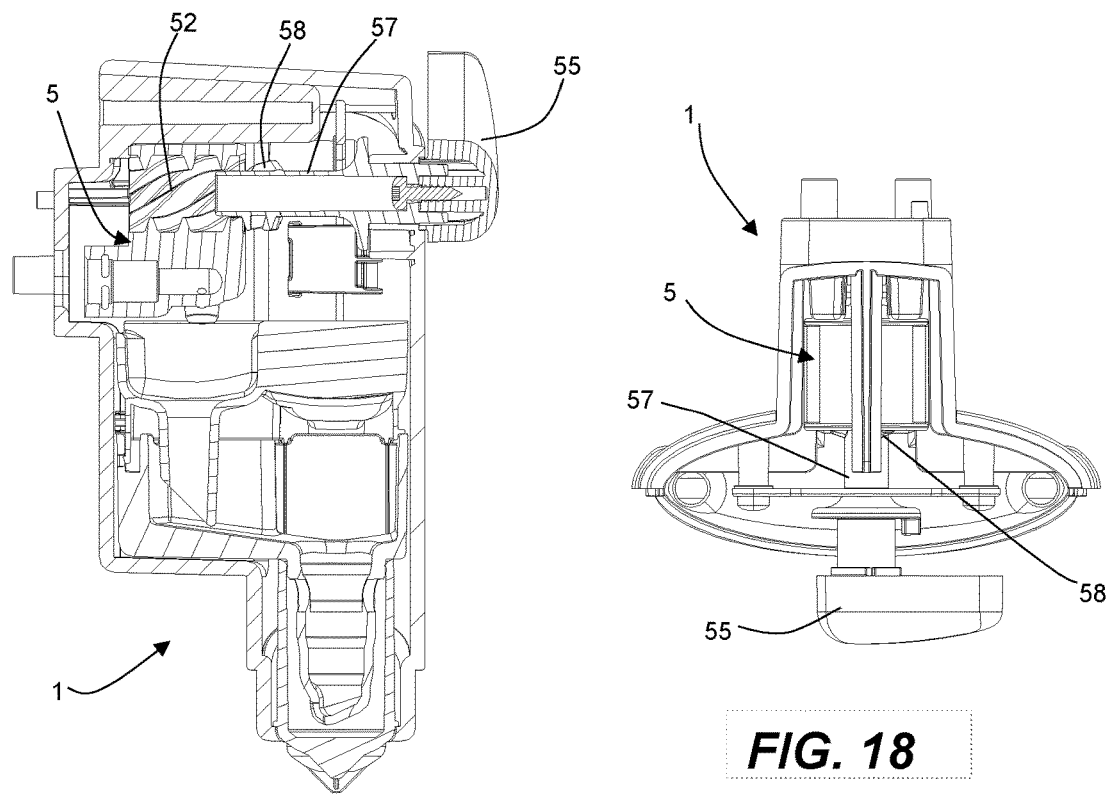
*FIG. 17*
*FIG. 18*
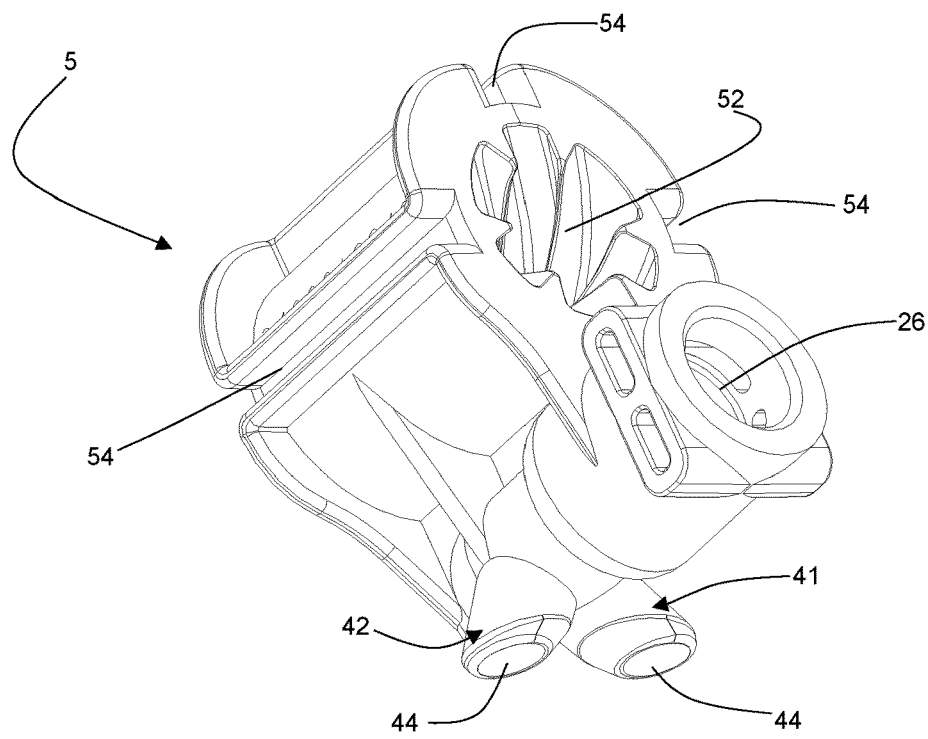
*FIG. 19*

BEVERAGE DISPENSING UNIT AND APPARATUS COMPRISING SAID DISPENSING UNIT

This invention relates in general to the sector of dispensing beverages using apparatuses that, in particular, make a beverage by infusion of a food substance. Specifically, this invention relates to a dispensing unit for such an apparatus, and to an apparatus comprising the dispensing unit and to a method for dispensing a beverage. This invention is applied, in particular, in apparatuses intended to make coffee such as espresso coffee.

Beverage-making apparatuses usually comprise an infusion chamber designed to receive a powdered food substance (for example, contained in a capsule, a pod or in another permeable or pierceable wrapper). Hot water is injected into the infusion chamber for infusion of the food substance, thereby obtaining the beverage. An outfeed duct drains the beverage from the infusion chamber and carries it to a spout which dispenses the beverage into a cup or other container from which the consumer can drink.

In particular contexts the beverage may need to be dispensed into two cups simultaneously. For example, this may be necessary in public premises or other businesses, where simultaneously making two cups of coffee or beverage speeds up service when many customers are waiting. However, this is not a constant requirement, therefore, at other times of day in the same premises or business the same apparatus has to be able to dispense a single cup of beverage.

As a result, it is necessary to be able to dispense a single cup of beverage or two cups simultaneously, as required by the user, using the same apparatus designed to make or supply the beverage.

Dispensing apparatuses are available for this purpose, having two dispensing spouts separated by a distance that is less than the usual width of small cups. To dispense two coffees, two small cups are placed side by side, each under a respective spout. To dispense a single coffee, one small cup is placed under both spouts. Such apparatuses are particularly inconvenient, since the user has to place the small cups in a very precise way. Also, since the spouts are inevitably not centred relative to the smalls cups, there is an increased risk that the edge of the small cup is dirtied by splashes of beverage. Such problems are further accentuated if the cups used are larger or smaller than those for which the apparatus is intended.

Other solutions have been proposed, in which the apparatus allows selection of single or double dispensing and, depending on the choice made, the beverage comes out of one spout or out of two spouts. Some examples of such solutions are described in European patent application No. EP1800577A1 and in international patent application No. WO2014/086602A1.

However, in general, the solutions currently available are not very satisfying. In some cases they are bulky and not easy to use. In other cases, they are unable to split the beverage into two substantially equal parts. In yet other cases, they are quite complex in terms of construction.

A technical purpose forming the basis of this invention is to allow a beverage to be dispensed into a single container or into at least two containers, as required, in a way that is convenient for the user and that overcomes at least some of the disadvantages of the prior art.

The technical purpose specified and the aims indicated are substantially achieved by a beverage dispensing unit according to claim 1, and by an apparatus according to claim 37 and by a method for dispensing a beverage according to claim 38.

Particular embodiments of the subject matter of this invention are defined in the corresponding dependent claims. This description includes embodiments of this invention that may be the subject of specific claims in this patent application, in divisional applications and/or in applications claiming the priority of this application.

According to one aspect of the solution proposed by this invention, the dispensing unit comprises three dispensing spouts, of which one is used for dispensing into a single container (in particular a cup) and the other two are used for simultaneously dispensing into two containers (in particular two cups). From the point of view of ease of use, that is advantageous for the user because the positions where the containers must be placed in one case or the other are univocally defined. Moreover, the two spouts for simultaneous dispensing can be positioned far apart enough to allow centred dispensing in the containers for a wide range of sizes of containers.

In one embodiment, the three dispensing spouts are positioned alongside each other and the spout for single dispensing is interposed between the other two spouts. That is useful for supplying a compact dispensing unit that still has the above-mentioned advantages. Moreover, in any case the one or two containers are to be positioned symmetrically relative to a sagittal vertical plane. Therefore, their correct positioning is immediate and intuitive for the user.

According to another aspect of the solution proposed by this invention, the dispensing unit comprises two ducts, each of which receives a respective part of the beverage to be dispensed and introduces it into a dispensing spout, directly or with other components interposed between them. The presence of the two ducts is useful for allowing two substantially equal flows of beverage, and therefore two containers that are filled with equal quantities. For example, to divide a single flow of beverage into two substantially equal parts, a flow divider is placed upstream of the two ducts.

Depending on the number of containers or cups to be dispensed into, the ducts introduce their part of the beverage both into the same spout, for single cup dispensing, or into two different spouts, for simultaneously dispensing into two cups. For this purpose, the liquid transfer path between the outfeeds of the ducts and the spouts can be modified by means of a movable member. That is useful for implementing simple switching between a single dispensing condition and a double dispensing condition. Specifically, the movable member can be operated manually by the user.

A dispensing unit according to this invention is particularly useful in combination with an apparatus able to use either capsules or pods dosed for a single coffee, or capsules or pods dosed for two coffees.

Therefore, a dispensing method according to this invention comprises two substantially equal parts of beverage flow being directed towards the same dispensing point for dispensing into a single container, or being respectively directed towards a second dispensing point and a third dispensing point for simultaneous dispensing into two containers.

Further features and the advantages of this invention are more apparent in the detailed description of several preferred, non-limiting example embodiments of a beverage dispensing unit for an apparatus.

Reference will be made to the accompanying drawings, in which:

FIG. 17 is a side view of the dispensing unit of FIG. 1 in the third position, sectioned according to the same section line as in FIG. 8;

FIG. 18 is a top view of the dispensing unit of FIG. 1 in the third position, a lid having been removed to show the internal components;

FIG. 19 is an axonometric view of an internal component of the dispensing unit of FIG. 1;

Figure 1:
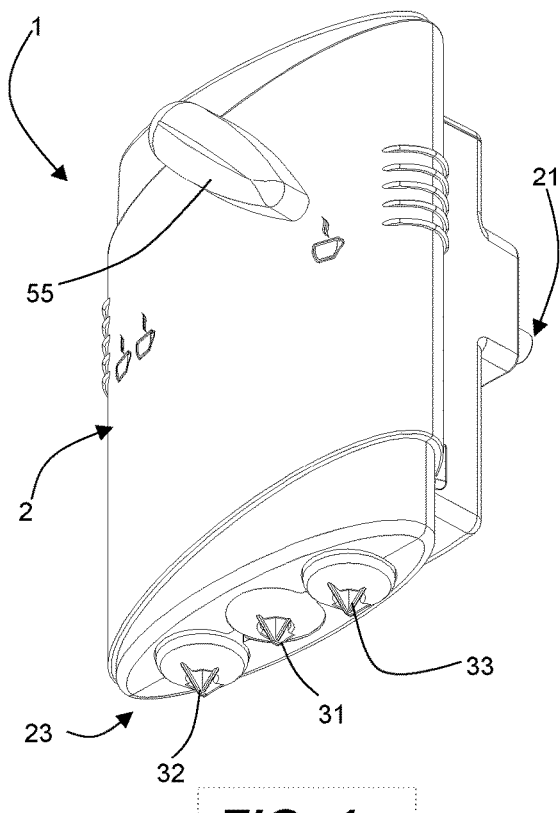
FIG. 1 is an axonometric view of a first embodiment of a dispensing unit according to this invention.
Figure 2:
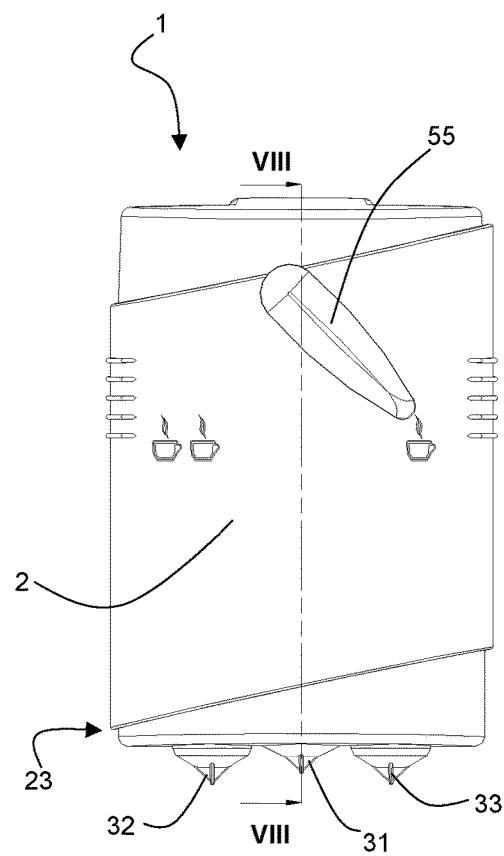
FIG. 2 is a front view of the dispensing unit of FIG. 1 in a first operating position.
Figure 3:
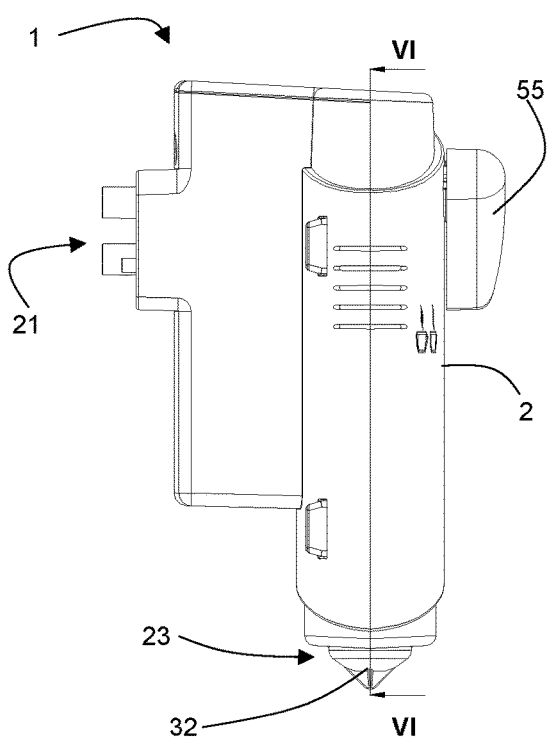
FIG. 3 is a side view of the dispensing unit of FIG. 1 in the first operating position.
Figure 4:
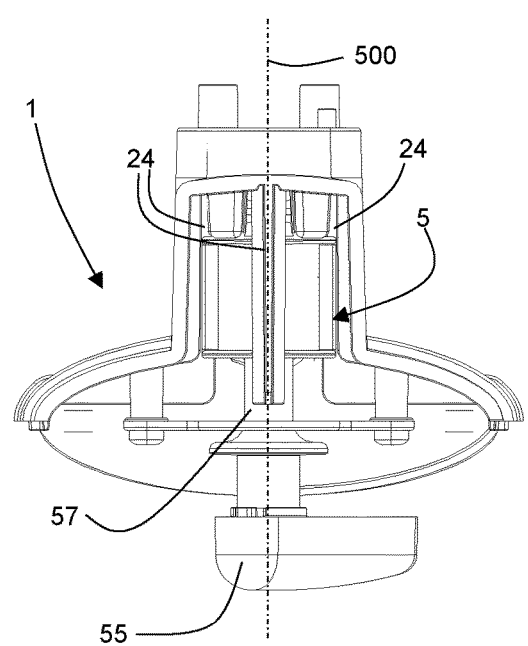
FIG. 4 is a top view of the dispensing unit of FIG. 1 in the first operating position, a lid having been removed to show the internal components.
Figure 5:
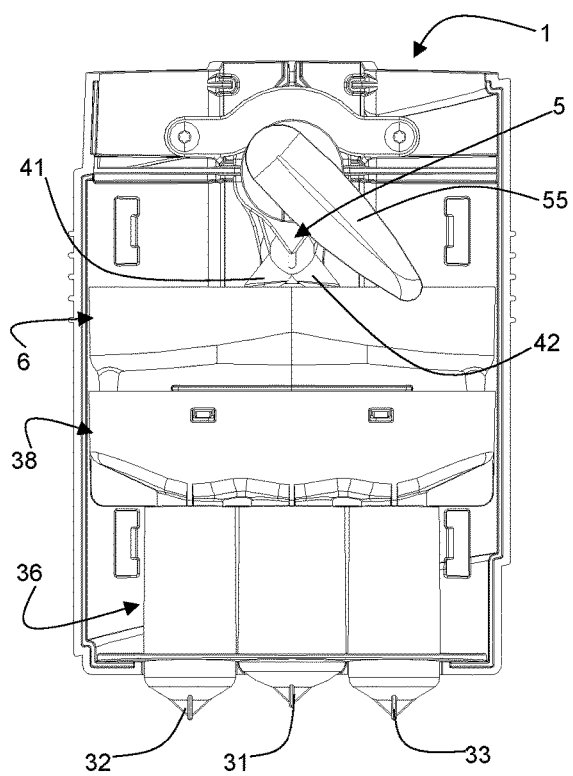
FIG. 5 is a front view of the dispensing unit of FIG. 1 in the first operating position, a front wall having been removed to show the internal components.
Figure 6:
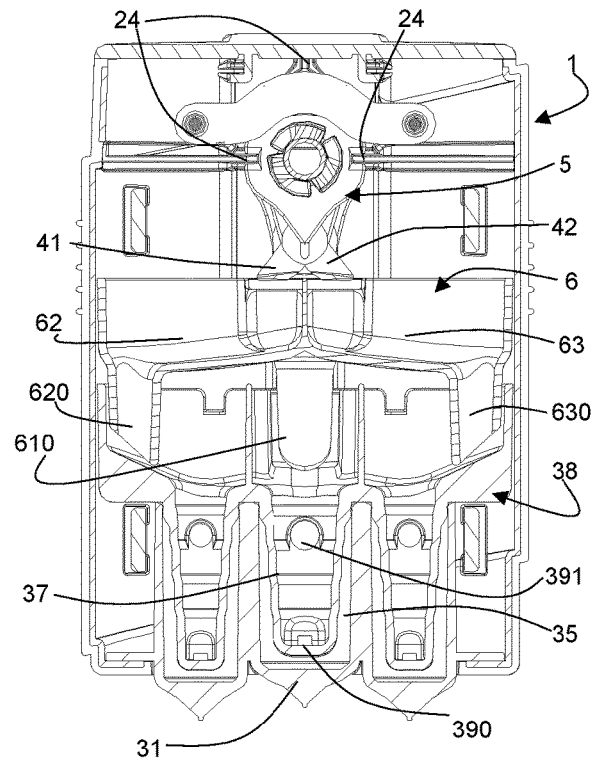
FIG. 6 is a front view of the dispensing unit of FIG. 1, sectioned according to a section line VI-VI in FIG. 3.

With reference initially to FIGS. 1 to 35, the numeral 1 denotes a first embodiment of a beverage dispensing unit according to this invention.

The dispensing unit 1 is intended for use in an apparatus (not illustrated in the figures) for supplying a beverage, in particular for supplying a coffee beverage, for example espresso coffee. Specifically, at least in some applications that apparatus is an apparatus for making a beverage, of the type comprising an infusion chamber in which a powdered food substance is infused with water (in particular, with pressurised hot water) to obtain the beverage. For example, the powdered food substance is contained in a capsule or in a pod, in particular of the single portion type or of the double portion type, which is inserted in the infusion chamber before use and is removed from the infusion chamber after use. Such apparatuses for supplying and/or making beverages are already known and, therefore, are not described in further detail herein.

The dispensing unit 1 is connected to an outfeed duct or channel of the infusion chamber of the apparatus. Therefore, the dispensing unit 1 receives the beverage that is made in the infusion chamber and dispenses it into cups or other containers, making the beverage available for consumption.

As already indicated, the dispensing unit 1 allows the beverage to be dispensed into a single container or cup, or simultaneously into two containers or cups, as required. Specifically, even when dispensing into two containers, the beverage comes from the same infusion. That is to say, the beverage was obtained in the infusion chamber during the same operation.

The dispensing unit 1 comprise a box-shaped case or body 2 mountable on the apparatus and, in particular mounted on guides (not illustrated) which make it height-adjustable. The dispensing unit 1 comprises an infeed section 21, through which in use the beverage to be dispensed enters the dispensing unit 1, and a dispensing section 23 comprising three dispensing spouts 31, 32, 33 through which in use the beverage is dispensed into the cups.

The infeed section 21 is connected to the outfeed of the infusion chamber by suitable pipes, not illustrated. The infeed section 21 may be simply represented by a connector for a pipe or by the mouth of a duct.

Inside the box-shaped body 2, the dispensing unit 1 also comprises two ducts 41, 42 interposed in parallel between the infeed section 21 and the dispensing section 23. Each of the two ducts 41, 42 has an infeed 43 in liquid transfer communication with the infeed section 21 and an outfeed 44 in liquid transfer communication with the dispensing section 23. The two ducts 41, 42 are therefore positioned in parallel and each of them is intended to receive a respective part or share of the beverage.

In particular, the flow of beverage is divided between the two ducts 41, 42 in two substantially equal parts. That division may be made upstream of the dispensing unit 1, that is to say, the beverage may enter the infeed section 21 already split into two parts, each fed to a respective duct 41, 42. Alternatively, the beverage is divided into two parts inside the dispensing unit 1. For that purpose, the dispensing unit 1 comprises a flow divider 25 that is interposed between the infeed section 21 and the infeeds 43 of the two ducts 41, 42. The flow divider 25 is designed to divide the beverage at infeed into two substantially equal parts that are fed to the two ducts 41, 42.

Inside the box-shaped body 2, the dispensing unit 1 also comprises a movable member 5 that is shiftable between a first position (shown in FIGS. 4 to 9) and a second position (shown in FIGS. 10 to 14), and vice versa. The movable member 5 is designed to change a liquid transfer path between the outfeeds 44 of the ducts 41, 42 and the dispensing section 23.

When the movable member 5 is in the first position, the two ducts 41, 42 are communicating with the dispensing section 23 in such a way that the respective parts of beverage are introduced into a same first spout 31. In this condition, the two parts of beverage flow are reunited and the beverage is dispensed into a single cup.

When the movable member 5 is in the second position, the two ducts 41, 42 are communicating with the dispensing section 23 in such a way that the respective part of beverage of one duct 41 is introduced into a second dispensing spout 32 and the respective part of beverage of the other duct 42 is introduced into a third dispensing spout 33. In this condition, the two parts of beverage flow remain separate and the beverage is simultaneously dispensed into two cups. Basically, the shifting of the movable member 5 between the two positions causes a different path for the beverage which, coming out of the ducts 41,42, goes towards the dispensing spouts 31, 32, 33.

In particular, the movable member 5 is designed to change the liquid transfer path by shifting the outfeeds 44 of the two ducts 41, 42 relative to the three dispensing spouts. In this way, downstream of the ducts 41, 42 the beverage flows follow paths that change depending on the position of the movable member 5 and on the region into which the beverage flows are introduced by the ducts 41, 42. These principles are found in all of the embodiments illustrated herein.

In the first embodiment, the movable member 5 comprises the two ducts 41, 42, which are therefore shiftable rigidly with the movable member 5 during the movement between the first position and the second position, and vice versa. Therefore, in this case, the movable member 5 shifts not just the outfeeds 44, but also the entire ducts 41, 42, which, in particular are made in one piece with the body of the movable member 5.

Moreover, in that embodiment the movable member 5 is of the translating type, that is to say, it is shiftable between the first position and the second position with a movement along an axis of translation 500. In particular, the axis of translation 500 is substantially horizontal during use and, in use, corresponds to a sagittal axis of a user positioned in front of the machine.

The shifting of the movable member 5 can be driven and controlled by a user. In the embodiment illustrated, that is implemented using a rotatable selector 55, in the form of a lever or a knob, which is connected to the movable member 5 by an operating screw 57. The rotatable selector 55 can be operated by the user and is shiftable between a first angular position and a second angular position.

In particular, the movable member 5 comprises an internally threaded tubular cavity 52. The threaded tubular cavity 52 extends parallel to the axis of translation 500 and constitutes a female screw for the operating screw 57 which is inserted in the tubular cavity 52. The operating screw 57 is fixed to the rotatable selector 55, with which it rotates jointly, and has teeth 58 that engage with the thread of the cavity 52. The movable body 5 is constrained to translate along the axis 500 without being able to rotate, thanks to grooves 54 that engage with corresponding ribs 24 fixed to the body of the dispensing unit 1.

Therefore, rotation of the rotatable selector 55 and of the operating screw 57 connected to it causes a shifting of the movable member 5 along the axis of translation 500. The thread of the tubular cavity 52 is designed in such a way that the first angular position of the rotatable selector 55 corresponds to the first position of the movable member 5 and the second angular position of the rotatable selector 55 corresponds to the second position of the movable member 5. In particular, in the first position the movable member 5 is shifted away from the rotatable selector 55 and from the user, whilst in the second position the movable member 5 is near the rotatable selector 55 and the user.

The dispensing unit 1 also comprises a distributing member 6 which is interposed between the two ducts 41, 42 and the three dispensing spouts 31, 32, 33. The distributing member 6 comprises three chambers 61, 62, 63 separate from each other. Each chamber communicates with a respective dispensing spout.

During use, the distributing member 6 is stationary relative to the dispensing spouts and to the body 2 of the dispensing unit 1. That is to say, the distributing member 6 does not change its position whether dispensing is into one cup or into two cups. The outfeeds 44 of the two ducts 41, 42 are shiftable relative to the distributing member 6 by means of the movable member 5.

Figure 7:
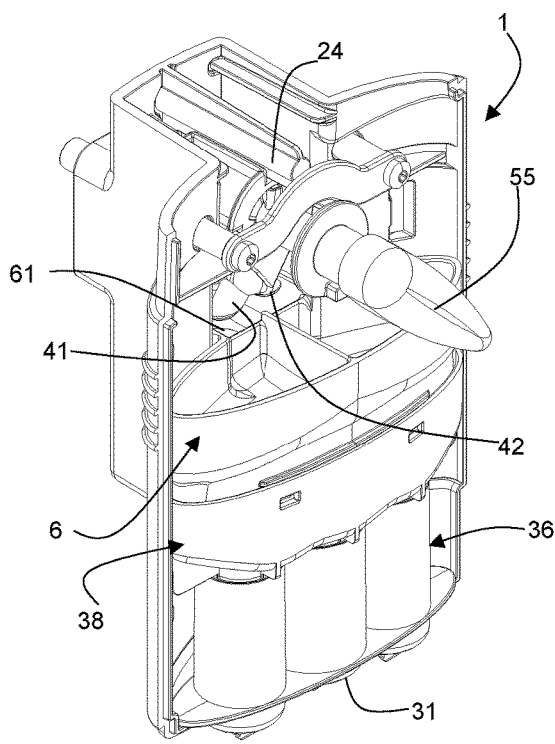
FIG. 7 is an axonometric view of the dispensing unit of FIG. 1 in the first operating position, some parts having been removed to show the internal components.
Figure 8:
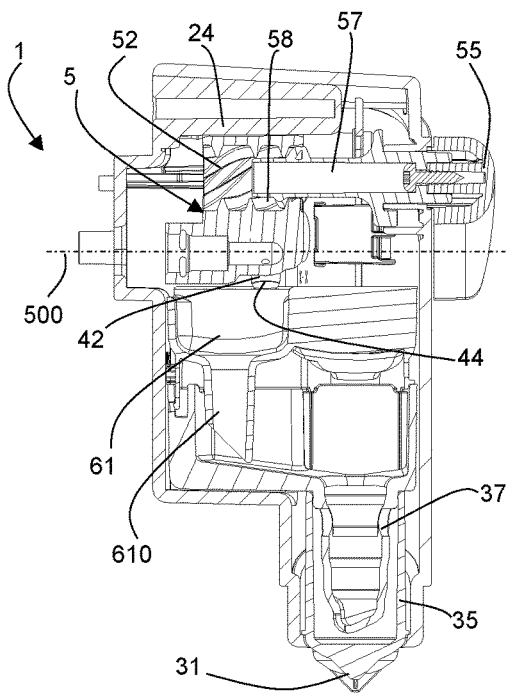
FIG. 8 is a side view of the dispensing unit of FIG. 1 in the first operating position, sectioned according to a section line VIII-VIII in FIG. 2.
Figure 9:
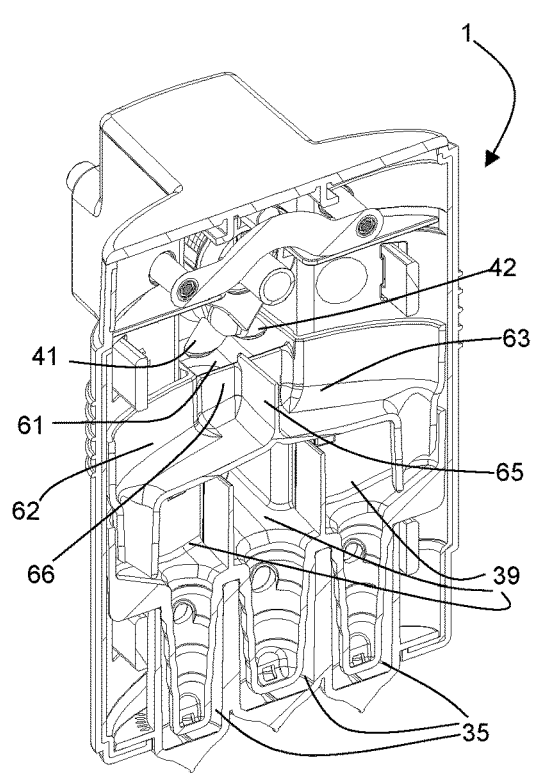
FIG. 9 is an axonometric view of the dispensing unit of FIG. 1 in the first operating position, sectioned according to the section line VI-VI in FIG. 3.
Figure 10:
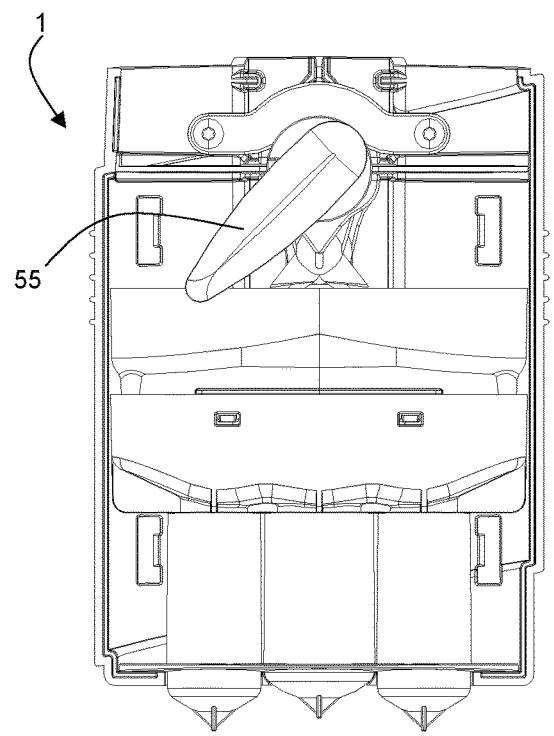
FIG. 10 is a front view of the dispensing unit of FIG. 1 in a second operating position, a front wall having been removed to show the internal components.

When the movable member 5 is in the first position, the outfeeds 44 of the two ducts 41, 42 are positioned above or in a first chamber 61, which communicates with the first dispensing spout 31 (see in particular FIGS. 7 to 9). Therefore, the two parts of beverage flow are both introduced into the first chamber 61 and from there into the first spout 31, so dispensing into a single cup.

Figure 11:
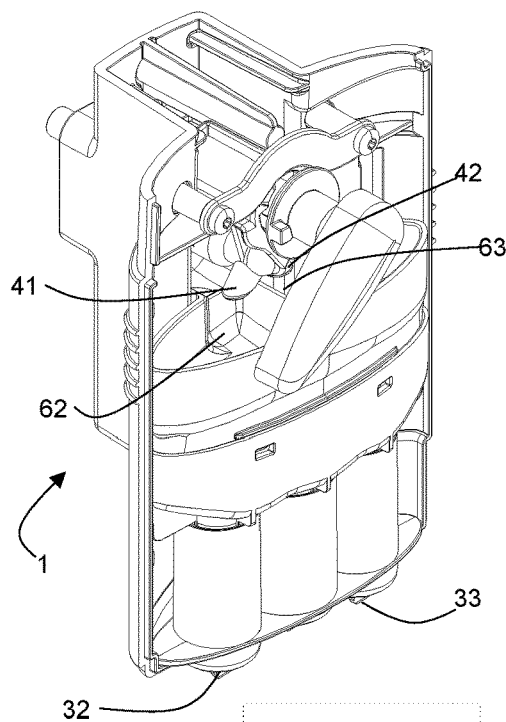
FIG. 11 is an axonometric view of the dispensing unit of FIG. 1 in the second operating position, some parts having been removed to show the internal components.
Figure 12:
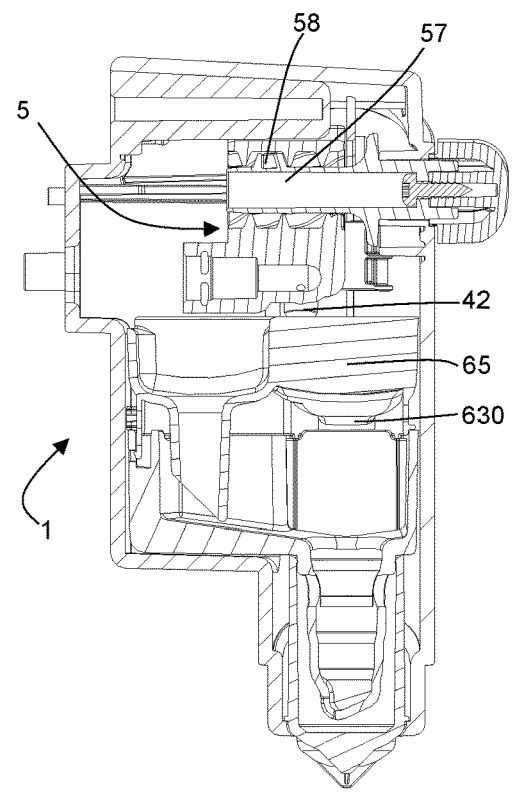
FIG. 12 is a side view of the dispensing unit of FIG. 1 in the second operating position, sectioned according to the same section line as in FIG. 8.
Figure 13:
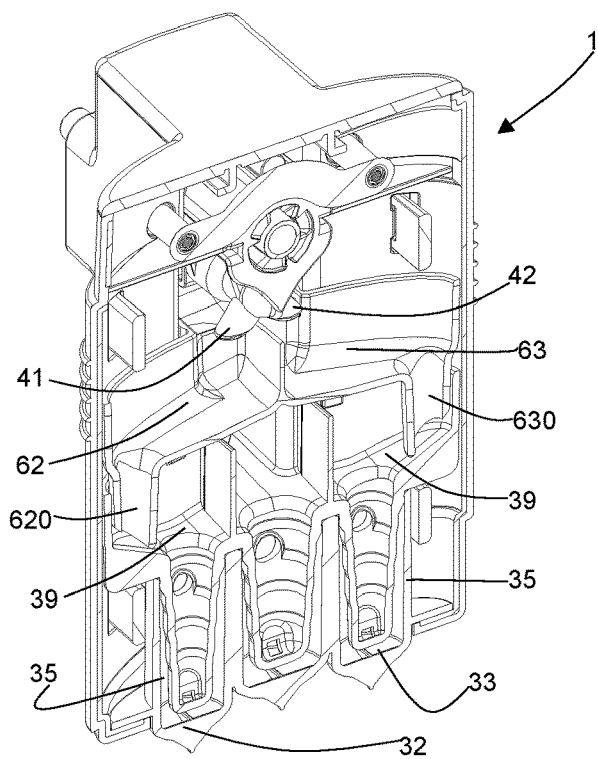
FIG. 13 is an axonometric view of the dispensing unit of FIG. 1 in the second operating position, sectioned according to the same section line as in FIG. 9.
Figure 14:
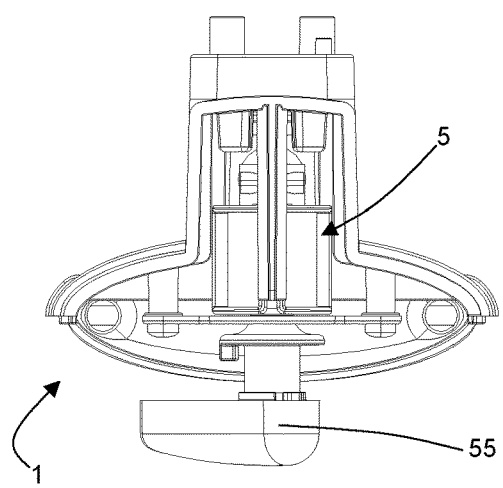
FIG. 14 is a top view of the dispensing unit of FIG. 1 in the second operating position, a lid having been removed to show the internal components.
Figure 15:
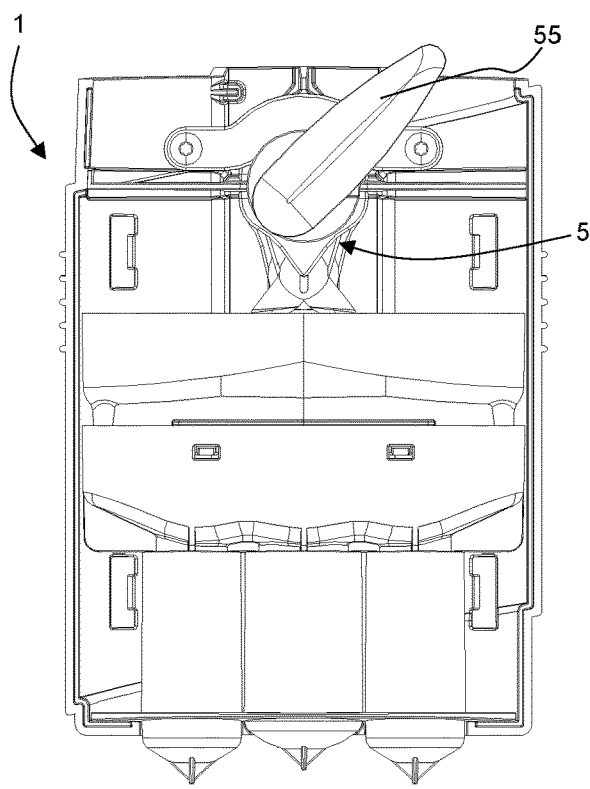
FIG. 15 is a front view of the dispensing unit of FIG. 1 in a third position, a front wall having been removed to show the internal components.
Figure 16:
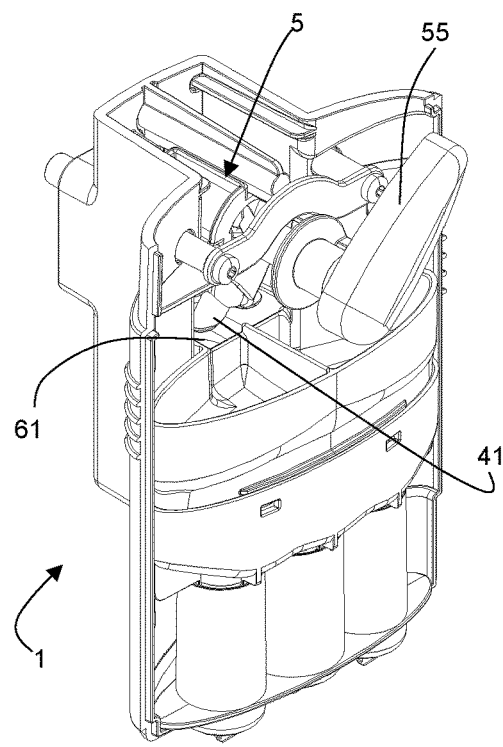
FIG. 16 is an axonometric view of the dispensing unit of FIG. 1 in the third position, some parts having been removed to show the internal components.
Figure 20:
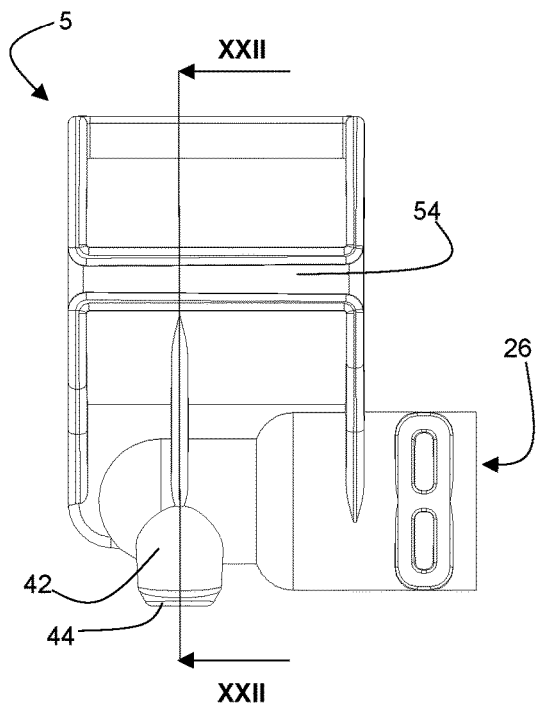
FIG. 20 is a side view of the internal component of FIG. 19.
Figure 21:
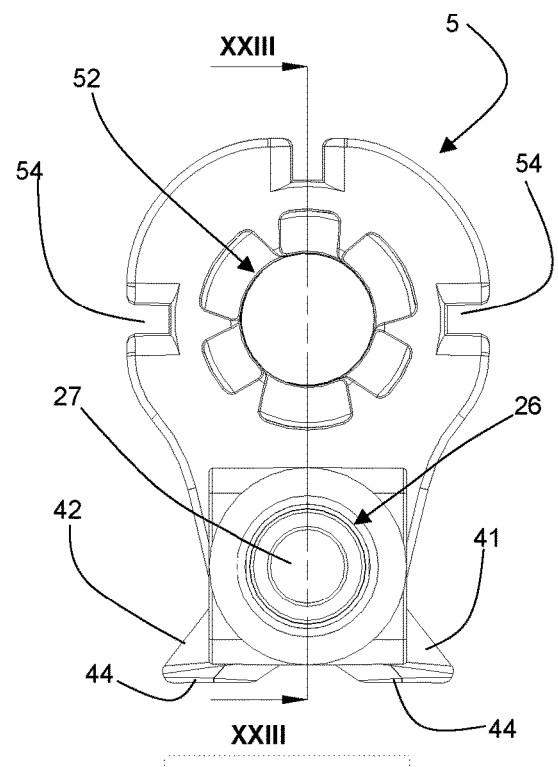
FIG. 21 is a rear view of the internal component of FIG. 19.
Figure 22:
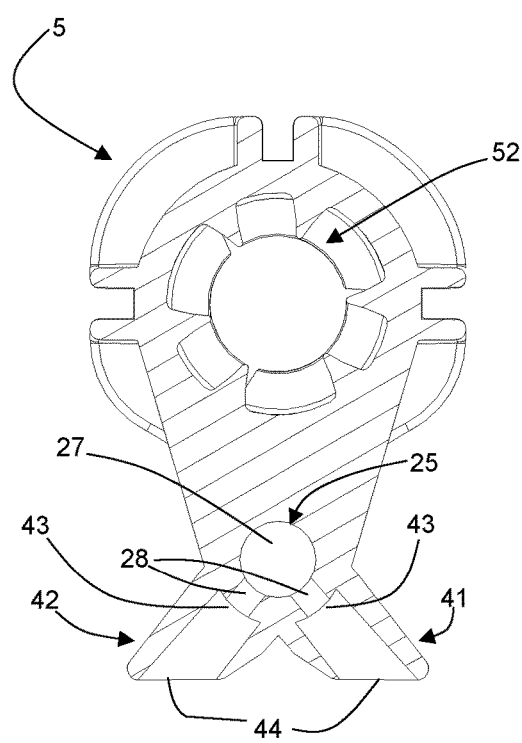
FIG. 22 is a front view of the internal component of FIG. 19, sectioned according to a section line XXII-XXII in FIG. 20.
Figure 23:
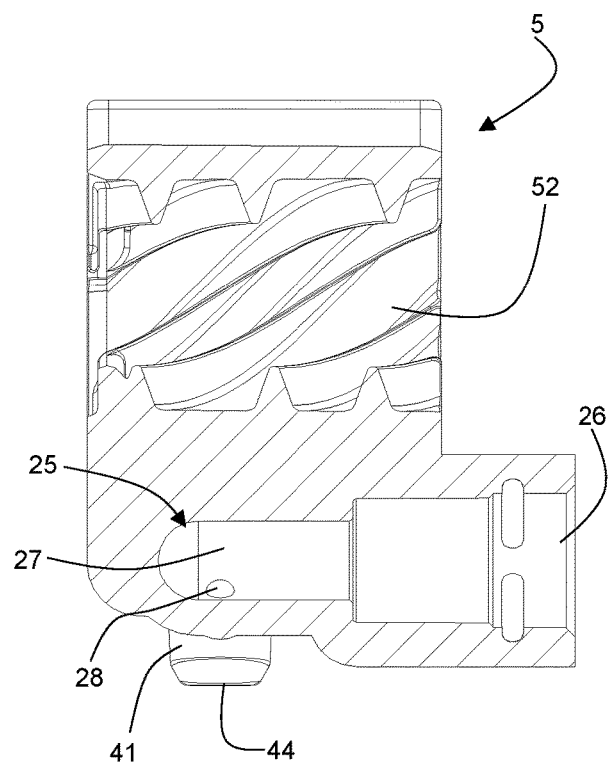
FIG. 23 is a side view of the internal component of FIG. 19, sectioned according to a section line XXIII-XXIII in FIG. 21.
Figure 24:
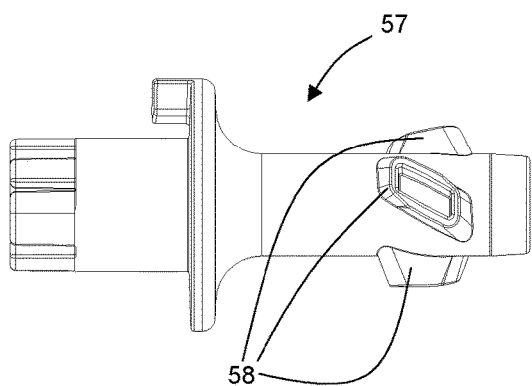
FIG. 24 is a side view of another internal component of the dispensing unit of FIG. 1.
Figure 25:
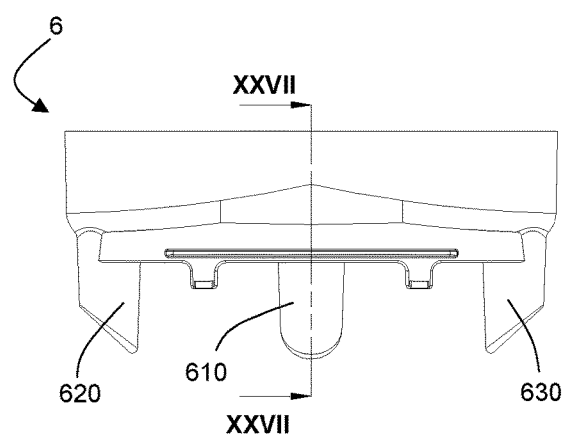
FIG. 25 is a front view of a further internal component of the dispensing unit of FIG. 1.
Figure 26:
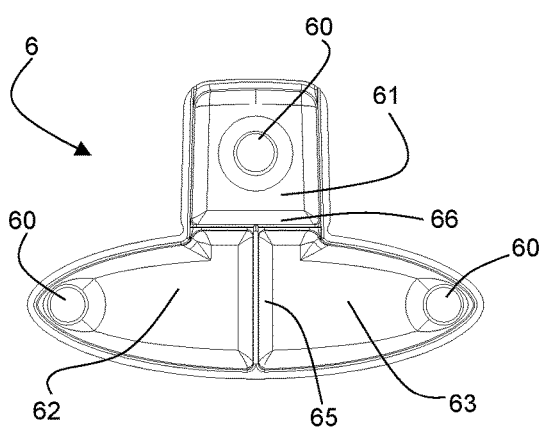
FIG. 26 is a top view of the internal component of FIG. 25.
Figure 27:
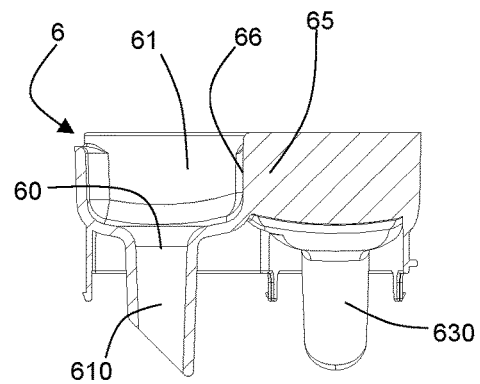
FIG. 27 is a side view of the internal component of FIG. 25, sectioned according to a section line XXVII-XXVII in FIG. 25.
Figure 28:
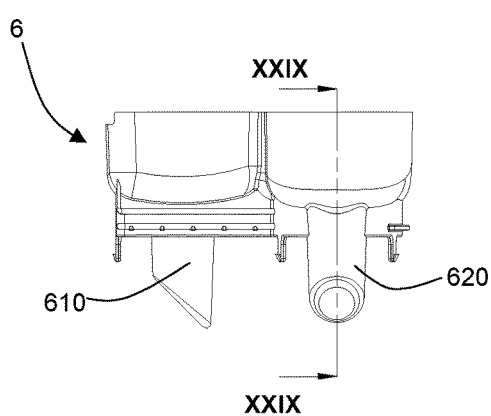
FIG. 28 is a side view of the internal component of FIG. 25.
Figure 29:
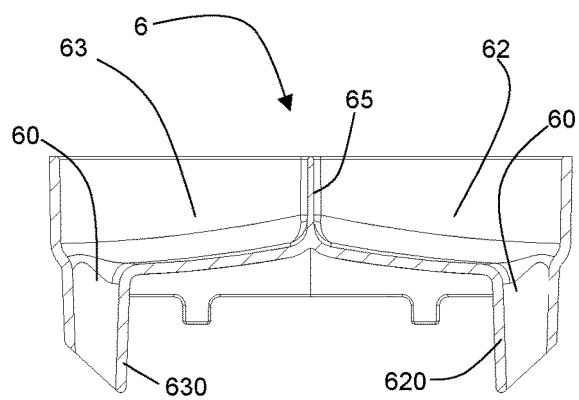
FIG. 29 is a front view of the internal component of FIG. 25, sectioned according to a section line XXIX-XXIX in FIG. 28.
Figure 30:
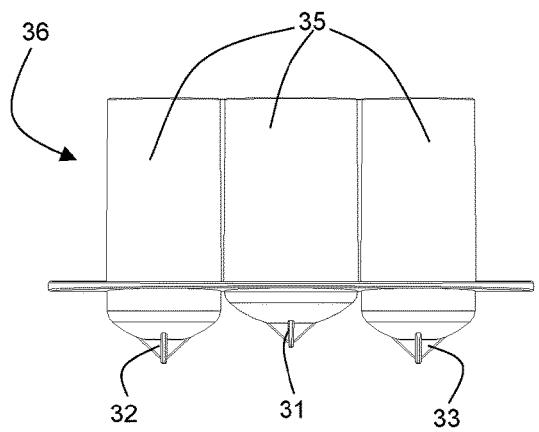
FIG. 30 is a front view of another component of the dispensing unit of FIG. 1.
Figure 31:
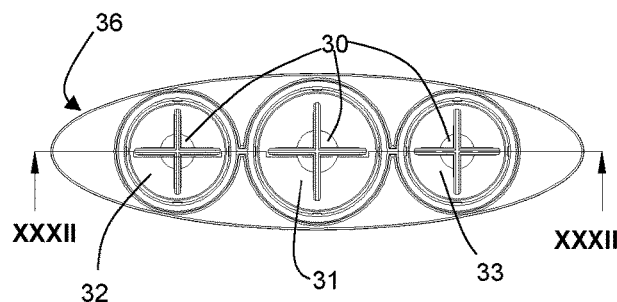
FIG. 31 is a top view of the component of FIG. 30.
Figure 32:
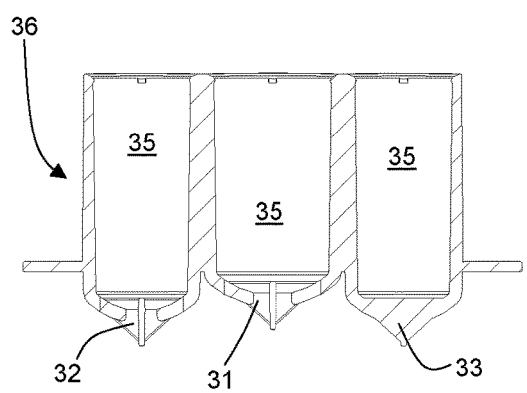
FIG. 32 is a front view of the component of FIG. 30, sectioned according to a section line XXXII-XXXII in FIG. 31.
Figure 33:
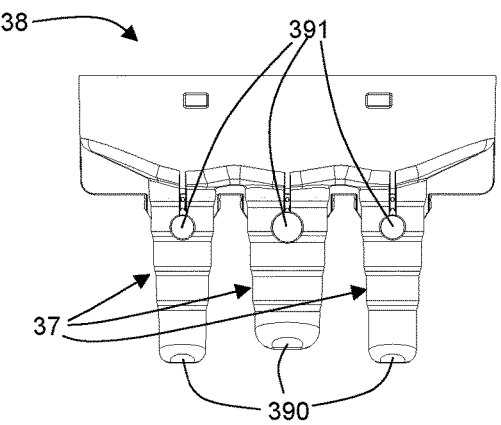
FIG. 33 is a front view of yet another component of the dispensing unit of FIG. 1.
Figure 34:
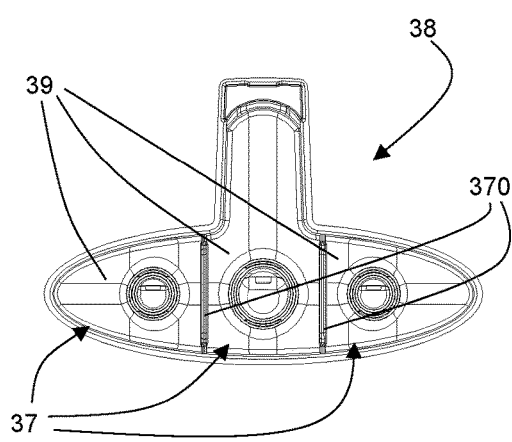
FIG. 34 is a top view of the component of FIG. 33.
Figure 35:
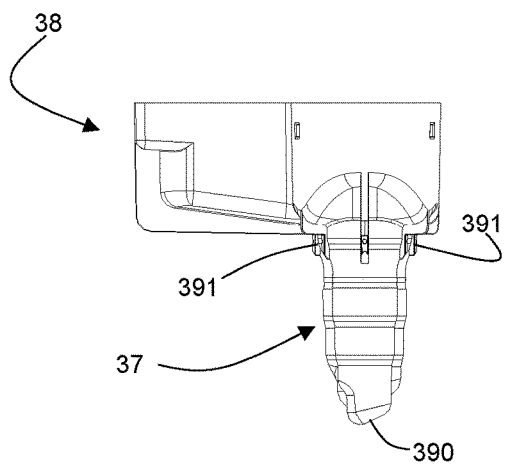
FIG. 35 is a side view of the component of FIG. 33.

When the movable member 5 is in the second position, the outfeed 44 of one duct 41 is positioned above or in a second chamber 62 which communicates with the second dispensing spout 32, whilst the outfeed 44 of the other duct 42 is positioned above or in a third chamber 63 which communicates with the third dispensing spout 33 (see in particular FIGS. 11 to 13). Therefore, the two parts of beverage flow remain separate and, following separate paths, reach the respective spouts 32, 33, so simultaneous dispensing into two cups.

As shown in FIGS. 25 to 29, the second chamber 62 and the third chamber 63 are side by side and are separated by a first partition 65. In the second position, the movable member 5 is above the first partition 65, which is below the space interposed between the two outfeeds 44. Basically, the outfeeds 44 are on opposite sides of the partition 65.

The first chamber 61 is offset relative to the second chamber 62 and to the third chamber 63, from which it is separated by a second partition 66. When the movable member 5 is in the first position, both outfeeds 44 are above the first chamber 61. During the switch between the first position and the second position, the two outfeeds 44 move from one side to the other of the second partition 66.

Basically, in plan view the three chambers 61, 62, 63 (considering for example their centres or their outfeed openings 60) are positioned substantially at the vertices of a triangle. The two partitions 65, 66 are arranged in a T shape.

In particular, the offset of the first chamber 61 relative to the second chamber 62 and to the third chamber 63 is along a line of offset that, in use, is substantially horizontal. Moreover, that line of offset is parallel to the axis of translation 500 of the movable member 5. As shown in the figures, the first chamber 61 is further from the user than the other two chambers 62, 63.

The three chambers 61, 62, 63 each comprise an outfeed opening 60 to a respective discharge channel 610, 620, 630.

In each chamber, the bottom slopes down towards the outfeed opening 60, which is in a position that is peripheral and away (as far as possible) from the introducing region, so as to allow a first decantation of the beverage. Moreover, the discharge channels comprise a lower end that is cut so that it is slanting, to avoid as far as possible incorporating air in the beverage during the discharge step.

In the embodiment illustrated, the three dispensing spouts are positioned alongside each other and in particular are located in the same vertical plane. The first spout 31 for single dispensing is in a position interposed between the second spout 32 and the third spout 33. The second spout 32 and the third spout 33 are therefore at the maximum distance from one another compatible with the acceptable dimensions for the dispensing unit 1. That is useful for leaving the maximum space for receiving two cups placed side by side for double dispensing.

Each dispensing spout 31, 32, 33 is on the bottom of a respective glass-shaped element 35. For example, the three glass-shaped elements 35 are part of a single body 36 that belongs to the dispensing section 23. Each glass-shaped element 35 is designed to receive the beverage and to make it come out through the respective dispensing spout with a substantially continuous flow, the flow rate being just less than the infeed flow rate into the cup-shaped element 35 for normal apparatus operating conditions. In other words, the glass-shaped element 35 is useful for equalising and evening out any fluctuations in the beverage infeed flow rate.

In the bottom of the glass-shaped element 35 there is an outfeed opening 30 through which the beverage descends into the dispensing spout. The transit cross-section of the outfeed opening 30 is selected with dimensions suitable for obtaining a desired outfeed flow rate. The outfeed opening 30 of the central glass-shaped element 35, to the first spout 31, is larger than the outfeed openings 30 of the lateral glass-shaped elements 35, taking into account the fact that during use the flow rate required for the central glass-shaped element is substantially double the flow rate required for each lateral glass-shaped element.

The volume of the central glass-shaped element is also larger than the volume of each lateral glass-shaped element. Those volumes are selected so that, during dispensing, they are large enough to prevent the respective glass-shaped element 35 from being completely filled and overflowing.

Moreover, a decanting member 37 is positioned at least partly in each glass-shaped element 35. The decanting member 37 is a hollow body that forms an inner chamber or cavity 39 and comprises a wall with at least one outfeed hole 390. In particular, the decanting member 37 comprises at top tank whose bottom is connected to a projection extending in the respective glass-shaped element 35. The top tank and the projection together form the inner cavity 39.

For example, the three decanting members 37 are part of a single body 38 that belongs to the dispensing section 23 and is interposed between the distributing member 6 and the body 36 with the glass-shaped elements 35.

Each decanting member 37 receives the beverage from a respective discharge channel 610, 620, 630 of the distributing member 6, located above, and discharges the beverage into the glass-shaped element 35 in which it is positioned. The inner chambers 39 are separated by partitions 370 to prevent the beverage from passing between them. In plan view, the body 38 has an outline similar to the outline of the distributing member 6 and the central decanting member 37 has an elongate shape, with a region below the discharge channel 610 of the first chamber 61 offset relative to the others.

The function of the decanting member 37 is to hold the beverage for the time necessary to release the air incorporated in it. For this purpose, the volume of the inner chamber 39, the transit cross-section of the outfeed hole 390, the path provided for the beverage and the shape of the decanting member 37 are selected by taking into account this function. Moreover, the body 38 with the decanting members 37 returns the offset flow arriving from the first chamber 61 to a condition aligned with the flows arriving from the other chambers 62, 63, consistent with the aligned arrangement of the dispensing spouts.

The outfeed hole 390 is made in a lower region of the inner cavity 39, in particular at the centre of the bottom of the latter. That hole 390 is effective with low flow rates of the beverage, which is held for several seconds in the decanting member 37.

Moreover, at least one lateral outfeed hole 391 is made in an upper region of the inner cavity 39, in particular at the top of said projection, for improved dispensing of beverages with higher flow rates. In these cases, the projection of the inner cavity 39 is filled as far as the lateral outfeed hole 391, from which the beverage comes out into the respective glass-shaped element 35.

As already indicated, the dispensing unit 1 comprises a flow divider 25 which divides the beverage at infeed into two substantially equal parts.

Specifically, the flow divider 25 comprises an inner chamber 27 intended to receive the beverage fed in and two calibrated nozzles 28 that form outfeed passages from the inner chamber 27. The two nozzles 28 are calibrated in the sense that they have the same transit cross-section and are identical. In use, during dispensing the inner chamber 27 fills with beverage and, thanks to the upstream pressure, this beverage is forced out through the two nozzles 28, which are identical and have a small diameter compared with the dimensions of the inner chamber 27. Consequently, the flow of beverage that enters the first nozzle 28 is practically equal to the flow of beverage that enters the second nozzle 28. That allows the beverage fed in to be divided into two substantially equal parts, which are introduced into the two ducts 41, 42.

In the embodiment illustrated, the flow divider 25 is inside the movable member 5, which therefore comprises both the flow divider 25 and the ducts 41, 42. The movable member 5 comprises an infeed channel 26 communicating with the inner chamber 27 of the flow divider 25. A pipe (not illustrated) can engage in said channel 26 for feeding the flow divider with the beverage to be dispensed. The mouth of the infeed channel 26 may be considered to be the infeed section 21.

To avoid interfering with the movements of the movable member 5, said pipe is, for example, a flexible pipe.

The rotatable selector 55 is shiftable to a third angular position, illustrated in FIGS. 15 to 18. At that third position, the rotatable selector 55 is disconnected from the movable member 5. The movable member 5 is substantially at the end of its stroke away from the rotatable selector 55 and the teeth 58 of the operating screw 57 have disengaged from the thread of the cavity 52. In use, the operating screw 57 can be extracted from the cavity 52 with a simple translation towards the user and, therefore, the rotatable selector 55 can be removed from the dispensing unit 1. This is useful for allowing the dispensing unit 1 to be opened and disassembled for internal cleaning. To connect again the rotatable selector 55 to the movable member 5, the above operations are performed in reverse, inserting the operating screw 57 into the cavity 52 and rotating the rotatable selector 55 towards the first angular position.

An apparatus for supplying a beverage, which in particular is coffee or espresso coffee, may comprise one or more dispensing units 1, depending on the workload for which the apparatus has been designed. For example, a professional coffee-making apparatus comprises two infusion chambers that can be operated independently and two dispensing units 1, each connected to a respective infusion chamber.

For dispensing into a single cup, the user sets the rotatable selector 55 to the first angular position, places a cup under the first dispensing spout 31 and starts making the beverage. The beverage made in the apparatus enters the dispensing unit 1 from the infeed section 21, enters the movable member 5 and is divided into two parts in the flow divider 25. The two parts go through the ducts 41, 42 and are reunited, falling into the first chamber 61, which the beverage leaves through the discharge channel 610, moving into the inner cavity 39 of the central decanting member 37. The beverage comes out through the hole 390 (and in case through the holes 391) and goes into the central glass-shaped element 35, finally coming out of the first dispensing spout 31.

For simultaneously dispensing into two cups, the user sets the rotatable selector 55 to the second angular position, places one cup under the second dispensing spout 32 and another cup under the third dispensing spout 33, then starts making the beverage. The beverage made in the apparatus enters the dispensing unit 1 from the infeed section 21, enters the movable member 5 and is divided into two parts in the flow divider 25. From this moment, the two parts of beverage follow different paths: they pass through the ducts 41, 42 and respectively fall into the second chamber 62 and into the third chamber 63, which they exit through the respective discharge channels 620, 630, flowing into the inner chambers 39 of the lateral decanting members 37. The parts of beverage come out through the respective holes 390 (and in case through the holes 391) and go into the lateral glass-shaped elements 35, finally coming out of the second dispensing spout 32 and of the third dispensing spout 33 respectively.

In an alternative to the embodiment described above, the ducts 41, 42 and/or their outfeeds 44 may be stationary relative to the dispensing spouts and relative to the body 2 of the dispensing unit, whilst the movable member may be designed to shift the distributing member 6 relative to the outfeeds 44 so as to adopt the relative positions described above. In another alternative, the ducts and their outfeeds may be stationary relative to the body of the dispensing unit, whilst the distributing member and the dispensing spouts are horizontally translatable or rotatable about a vertical axis relative to the outfeeds of the ducts. In these alternatives as well, there is a change in the liquid transfer path between the outfeeds 44 of the two ducts 41, 42 and the dispensing section 23 caused by a movable member, which shifts the distributing member instead of the duct outfeeds, equally achieving the aim of the invention.

A second embodiment of a beverage dispensing unit according to this invention is described with reference to FIGS. 36 to 42 and is labelled with the numeral 13.

Unless expressly indicated, the parts that have a structure and function identical or similar to corresponding parts of the first embodiment described above are labelled using the same reference characters and are not described again in detail.

The dispensing unit 13 again comprises a box-shaped case or body 2, a front part of which is not illustrated in the figures, so that the internal components can be shown.

Unlike the dispensing unit 1, in the dispensing unit 13 the two ducts 41, 42 are not part of the movable member and are not shiftable rigidly with it.

In the dispensing unit 13, the two ducts 41, 42 are flexible or bendable, for example they are silicone hoses, and a movable member 53 is designed to bow or bend the two ducts 41, 42 in such a way as to shift the outfeeds 44 of the two ducts relative to the three dispensing spouts 31, 32, 33, thereby changing the liquid transfer path. In particular, the two ducts 41, 42 are elastically deformable and therefore tend to return to an initial shape.

In the embodiment illustrated, the dispensing unit 13 comprises a flow divider 25 that is interposed between the beverage infeed section 21 and the infeeds 43 of the two ducts 41, 42, for dividing the beverage at infeed into two substantially equal parts. In this case, the flow divider 25 is fixed to the body of the dispensing unit 13 and is not part of the movable member 53.

Similarly to what has already been described, the flow divider 25 comprises an inner chamber 27 intended to receive the beverage and two calibrated nozzles 28 that form outfeed passages from the inner chamber 27. The infeeds 43 of the two ducts 41, 42 are mounted directly on two calibrated nozzles 28 and the two ducts 41, 42 diverge with an inverted V arrangement.

The dispensing unit 13 comprises an infeed channel 26 communicating with the inner chamber 27 of the flow divider 25. A pipe (not illustrated) arriving from the infusion chamber can engage in that channel 26 for feeding the flow divider with the beverage to be dispensed. The mouth of the infeed channel 26 may be considered to be the infeed section 21.

The movable member 53 is of the translating type and is shiftable between the first position (shown in FIGS. 36 and 37) and the second position (shown in FIGS. 38 to 41), and vice versa, with a movement along an axis of translation 530 which, in particular, is substantially vertical during use of the dispensing unit 13.

The movable member 53 comprises an elongate slot 531 which extends along the axis of translation 530 and slidably receives a tooth 243 fixed to the box-shaped body 2 of the dispensing unit 13. Thanks to the fact that the elongate slot 531 and the tooth 243 operate in conjunction with one another, the movable member 53 is constrained to perform said translating movement. The movable member 53 also comprises two projecting elements that form seats 535 positioned at a distance from each other. The seats 535 each receive a section or stretch of a respective duct 41, 42. In particular, said two seats 535 are substantially C-shaped and face each other, the two ducts 41, 42 passing in the region between the two seats 535.

During the translating movement of the movable member 53, the two seats 535 slide along the two ducts 41, 42 and therefore force a distance between the sections of the two ducts 41, 42 that are received in the seats 535. In other words, the movement of the movable member 53 and of the seats 535 causes the ducts 41, 42 to move towards or away from one another. In fact, it should be noticed that the two ducts 41, 42 diverge and are not parallel with the axis of translation 530. In this way, the movable member also shifts the outfeeds 44 of the two ducts 41, 42.

In the first position, in which the movable member 53 is shifted downwards and is closer to the outfeeds 44, the walls of the seats 535 keep the ducts 41, 42 in a condition in which they are bent towards each other and their outfeeds 44 are near each other.

In the second position, in which the movable member 53 is shifted upwards and is further from the outfeeds 44, the ducts 41, 42 are in a condition in which they diverge and their outfeeds 44 are far away from each other.

In particular, if the ducts are elastically deformable they tend to spontaneously return to the diverging condition shown for the second position. Alternatively, the seats 535 may have the shape of a ring (through which the respective duct passes) for guiding the ducts towards the diverging condition in the second position irrespective of the elasticity of the ducts themselves.

In the embodiment shown, the ducts 41, 42 always remain coplanar, in particular in a vertical plane.

A translating selector, which can be operated by a user, is connected to the movable member 53 for allowing the user to operate and control the shifting of the movable member 53. A translation of the selector between a first condition and a second condition, and vice versa, causes a shifting of the movable member 53 between the first position and the second position, and vice versa.

Specifically, the translating selector is formed by two teeth 553 that project laterally from the body 2 of the dispensing unit 13 and are slidable in suitable slots made in the body 2. The two teeth 553, which in particular are made in one piece with the movable member 53, can be gripped between the fingers of the user to shift the movable member 53 down and up. Basically, it is a selector with double lateral grip.

Alternatively, the translating selector could be a tooth or a knob projecting from the front face of the body of the dispensing unit 13.

The dispensing unit 13 also comprises a distributing member 6 which is interposed between the two ducts 41, 42 and the three dispensing spouts.

Similarly to what is described above, the distributing member 6 comprises three chambers 61, 62, 63 separate from each other. Each chamber communicates with a respective dispensing spout. Specifically, the first chamber 61 is interposed between the second chamber 62 and the third chamber 63. The chambers are separated by partitions 67.

During use, the distributing member 6 is stationary relative to the dispensing spouts and to the body 2 of the dispensing unit 13. That is to say, the distributing member 6 does not change its position whether dispensing is into one cup or into two cups. The outfeeds 44 of the two ducts 41, 42 are shiftable relative to the distributing member 6 by means of the movable member 53.

Figure 36:
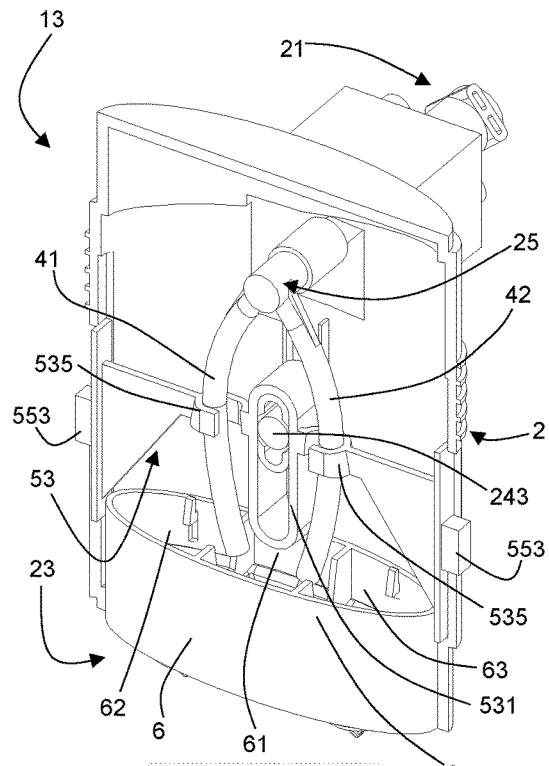
FIG. 36 is an axonometric view of a second embodiment of a dispensing unit according to this invention, in a first operating position; in this figure and in the following figures, a front wall of the dispensing unit has been removed to show the internal components.
Figure 37:
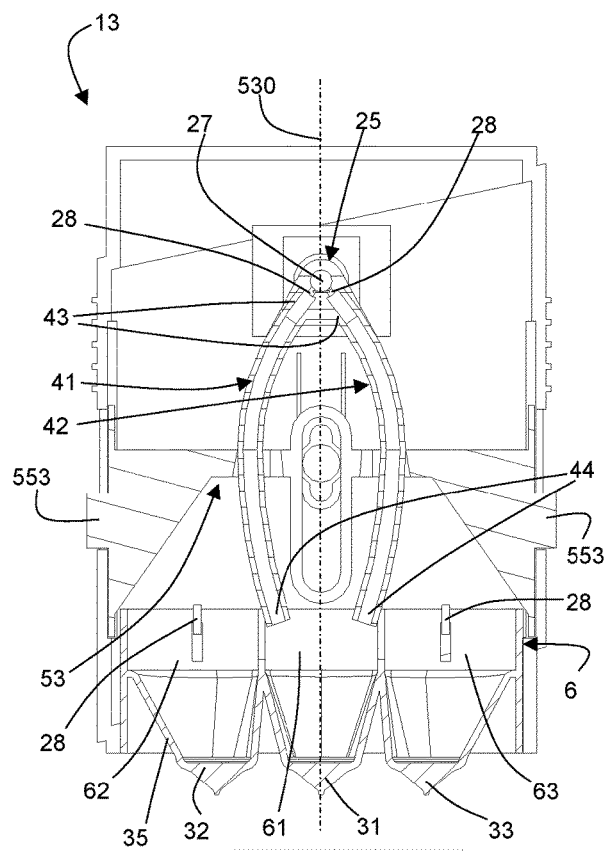
FIG. 37 is a sectional front view of the dispensing unit of FIG. 36 in the first operating position.
Figure 38:
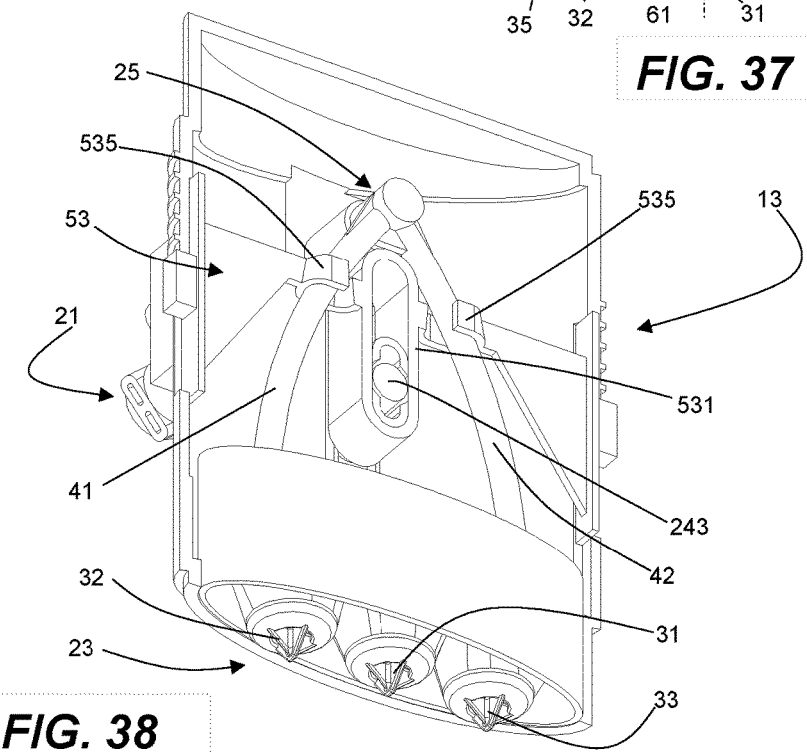
FIG. 38 is an axonometric view of the dispensing unit of FIG. 36 in a second operating position.

When the movable member 53 is in the first position, the outfeeds 44 of the two ducts 41, 42 are near each other so that they are positioned above or in the first chamber 61, which is central and communicates with the first dispensing spout 31 (see in particular FIGS. 36 and 37). Therefore, the two parts of beverage flow are both introduced into the first chamber 61 and from there into the first spout 31, so dispensing into a single cup.

Figure 39:
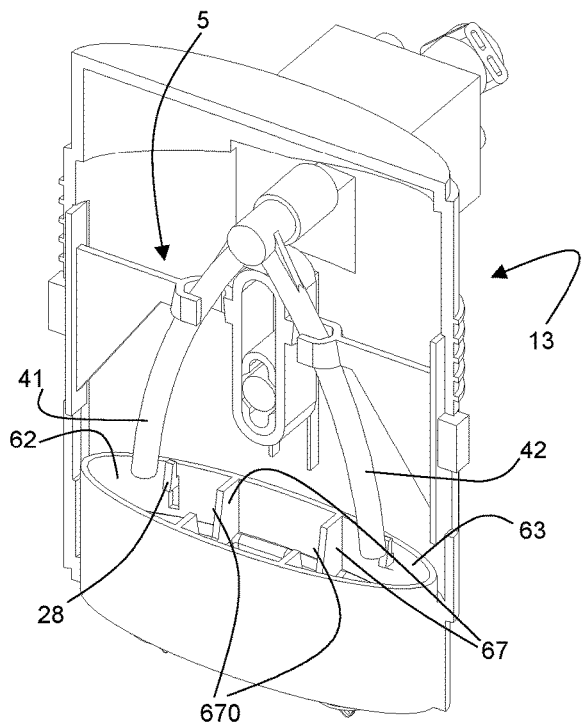
FIG. 39 is another axonometric view of the dispensing unit of FIG. 36 in the second operating position.
Figure 40:
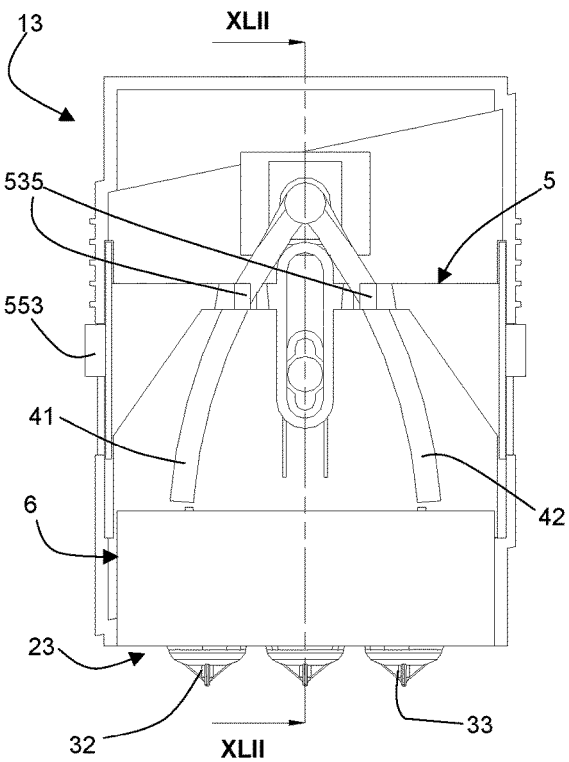
FIG. 40 is a front view of the dispensing unit of FIG. 36 in the second operating position.
Figure 41:
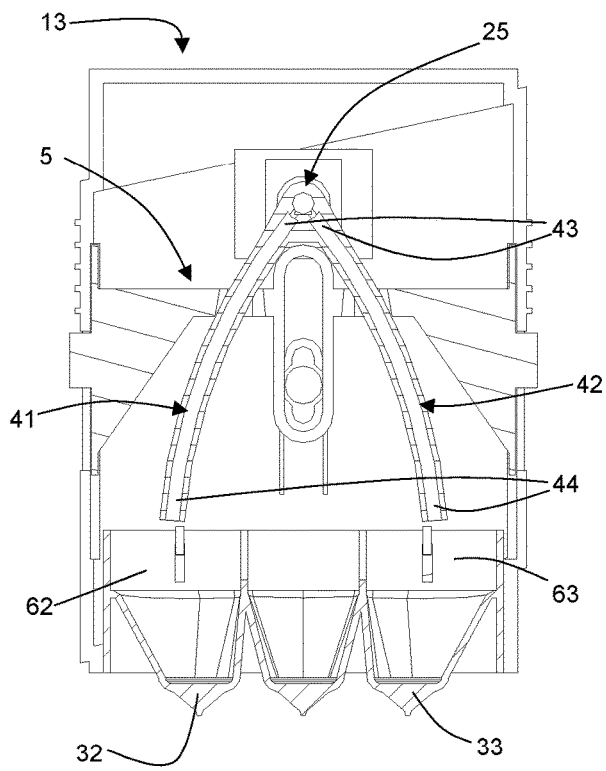
FIG. 41 is a sectional front view of the dispensing unit of FIG. 36 in the second operating position.
Figure 42:
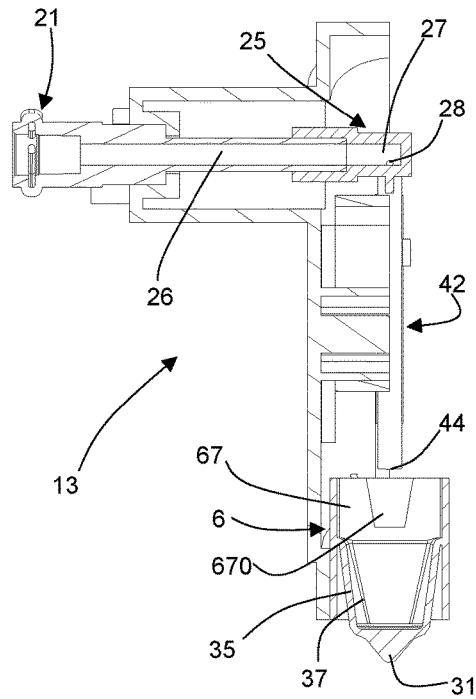
FIG. 42 is a side view of the dispensing unit of FIG. 36, sectioned according to a section line XLII-XLII in FIG. 40.
Figure 43:
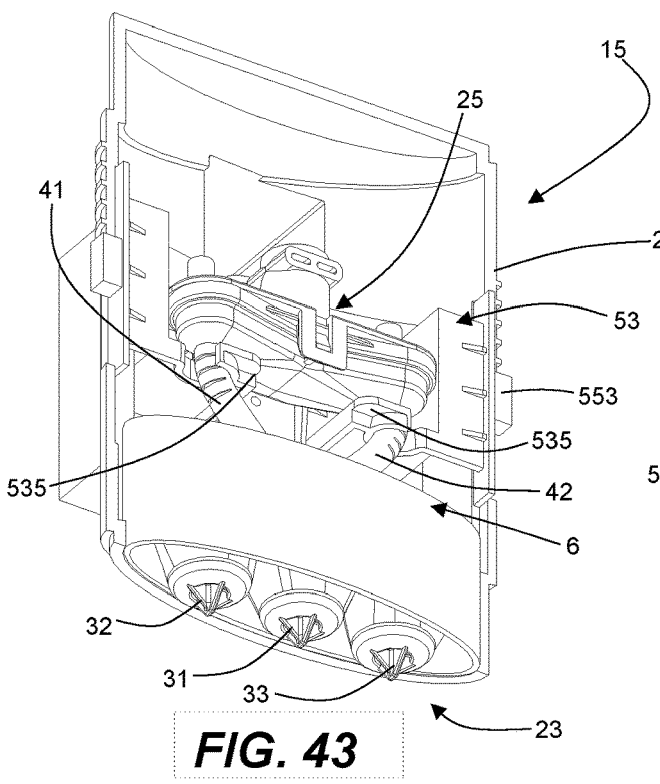
FIG. 43 is an axonometric view of a third embodiment of a dispensing unit according to this invention, in a first operating position; in this figure and in the following figures, a front wall of the dispensing unit has been removed to show the internal components.
Figure 44:
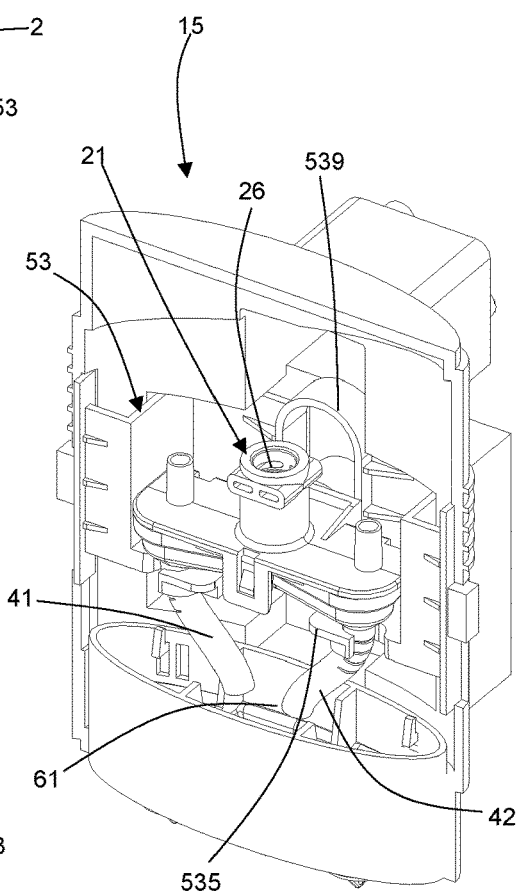
FIG. 44 is another axonometric view of the dispensing unit of FIG. 43 in the first operating position.
Figure 45:
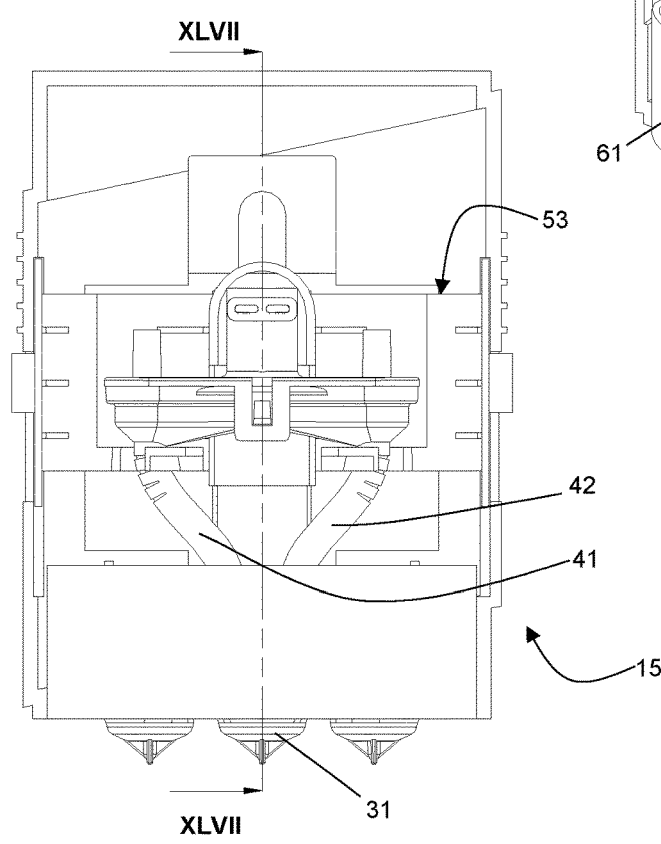
FIG. 45 is a front view of the dispensing unit of FIG. 43 in the first operating position.

When the movable member 53 is in the second position, the outfeeds 44 of the two ducts are far away from each other, so that the outfeed 44 of one duct 41 is positioned above or in the second chamber 62 which is lateral and communicates with the second dispensing spout 32, whilst the outfeed 44 of the other duct 42 is positioned above or in the third chamber 63 which is lateral and communicates with the third dispensing spout 33 (see in particular FIGS. 39 to 41). Therefore, the two parts of beverage flow remain separate and, following separate paths, reach the respective spouts 32, 33, so simultaneous dispensing into two cups.

To facilitate the passage of the outfeed ends of the ducts 41, 42 from one chamber to the other, each of the two separating partitions 67 has a recess or opening 670 that opens on the top edge of the partition 67.

Since the two ducts 41, 42 remain coplanar in the same plane both in the first position and in the second position, there is no need to offset the first chamber 61 relative to the other two chambers 62, 63. Therefore, compared with the dispensing unit 1, the dispensing unit 13 can be more compact and less thick. The dispensing unit 13 too may comprise decanting members 37 and glass-shaped elements 35, similarly to what has already been described relative to the dispensing unit 1. If necessary, the decanting members 37 and the glass-shaped elements 35 may be made in one piece with the distributing member 6, that is to say, they are incorporated in a single component.

The dispensing unit 13 can be disassembled for cleaning and maintenance. The calibrated nozzles 28 are removably inserted in the infeeds 43 of the ducts 41, 42. The pipe arriving from the infusion chamber can be removably inserted in the channel 26 by pressing it. The distributing member 6 is removably fixed to the body 2 by interlocking teeth 28.

A third embodiment of a beverage dispensing unit according to this invention is described with reference to FIGS. 43 to 49 and is labelled with the numeral 15.

Unless expressly indicated, the parts that have a structure and function identical or similar to corresponding parts of the embodiments described above are labelled using the same reference characters and are not described again in detail.

The dispensing unit 15 again comprises a box-shaped case or body 2, a front part of which is not illustrated in the figures, so that the internal components can be shown.

The dispensing unit 15 is based on the same principles as the second embodiment described above (dispensing unit 13), from which it mainly differs in terms of several features described below.

Figure 46:
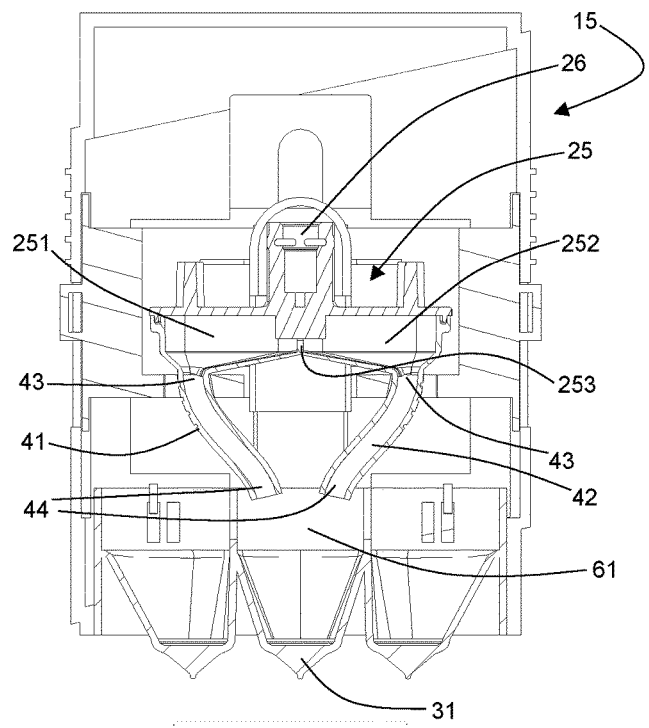
FIG. 46 is a sectional front view of the dispensing unit of FIG. 43 in the first operating position.
Figure 47:
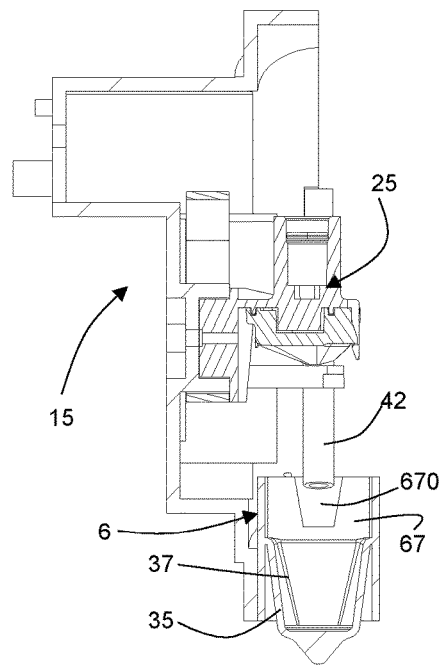
FIG. 47 is a side view of the dispensing unit of FIG. 43, sectioned according to a section line XLVII-XLVII in FIG. 45.
Figure 48:
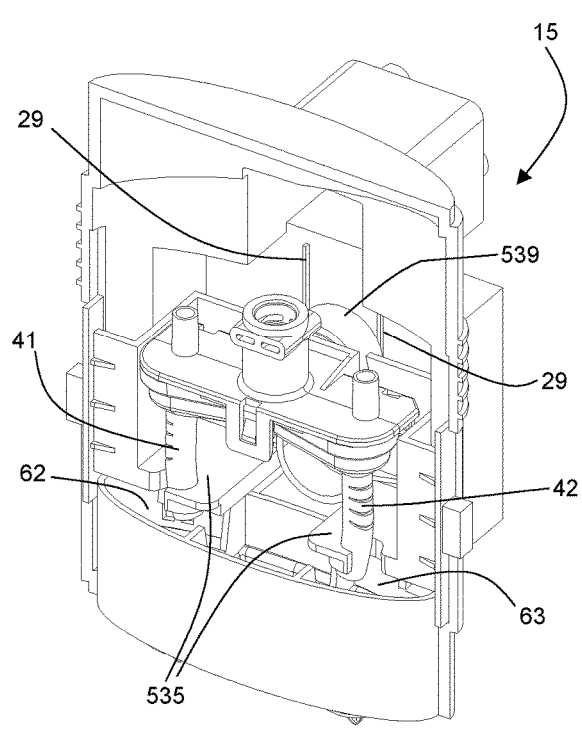
FIG. 48 is an axonometric view of the dispensing unit of FIG. 43 in a second operating position.
Figure 49:
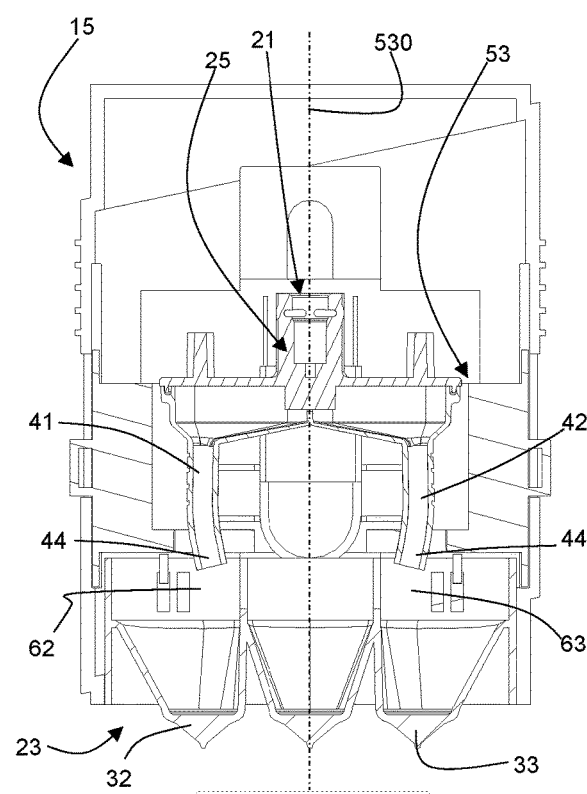
FIG. 49 is a sectional front view of the dispensing unit of FIG. 43 in the second operating position.
Figure 50:
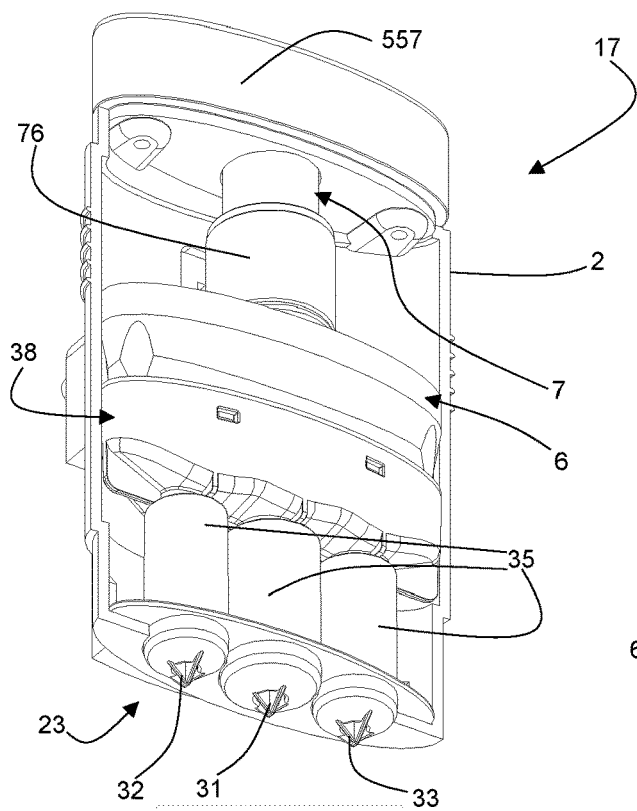
FIG. 50 is an axonometric view of a fourth embodiment of a dispensing unit according to this invention; in this figure and in the following figures, a front wall of the dispensing unit has been removed to show the internal components.
Figure 51:
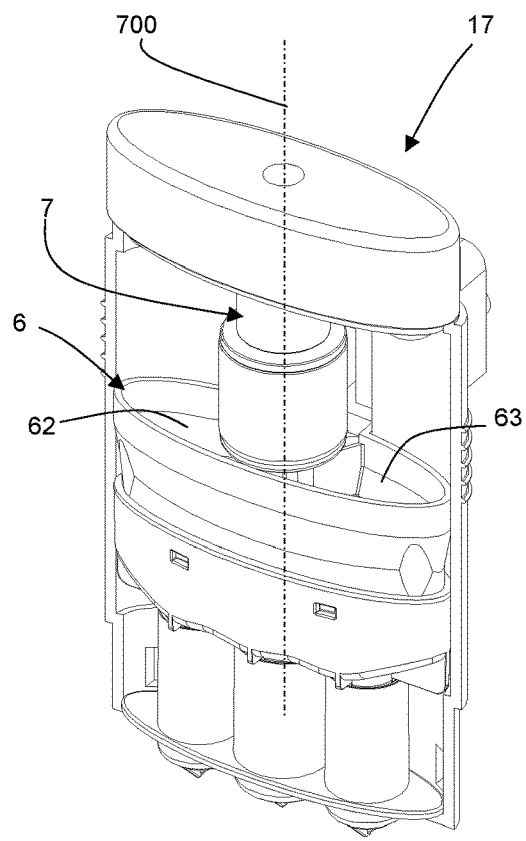
FIG. 51 is another axonometric view of the dispensing unit of FIG. 50.
Figure 52:
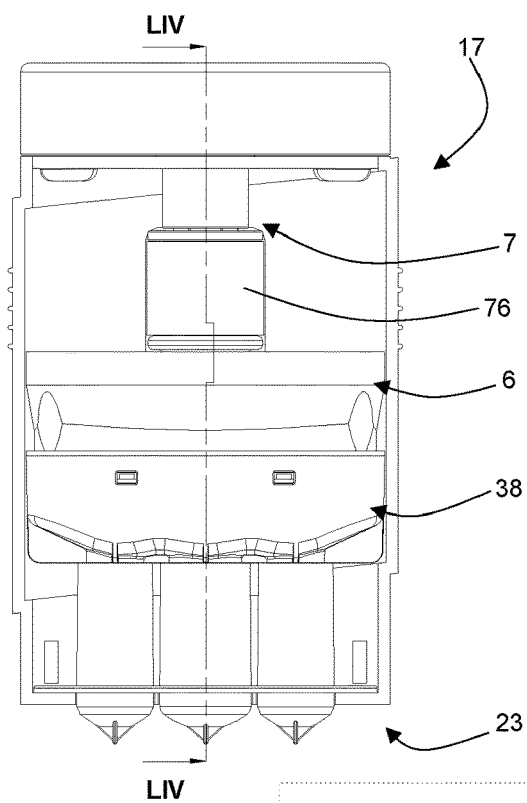
FIG. 52 is a front view of the dispensing unit of FIG. 50.
Figure 53:
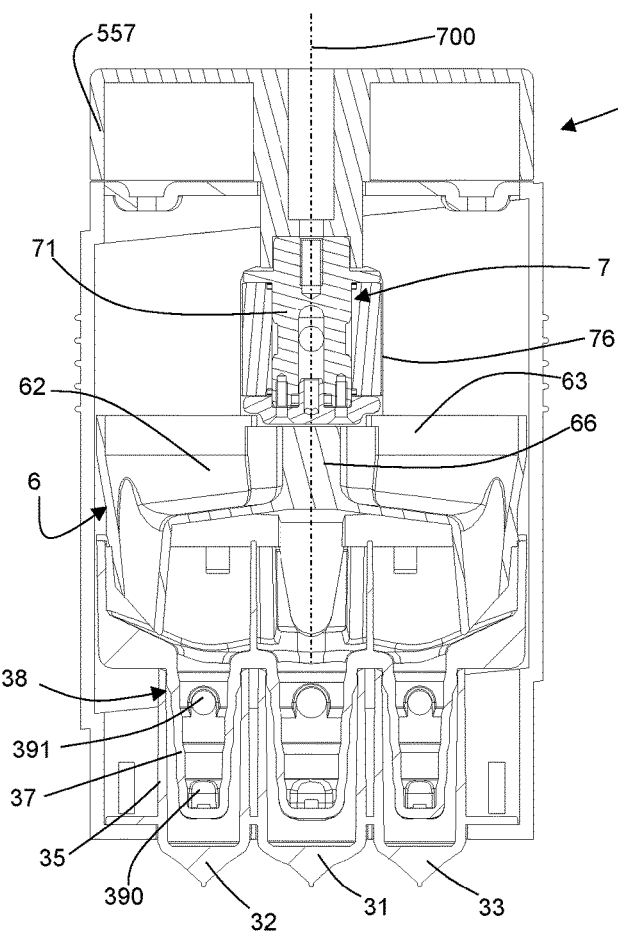
FIG. 53 is a sectional front view of the dispensing unit of FIG. 50.
Figure 54:
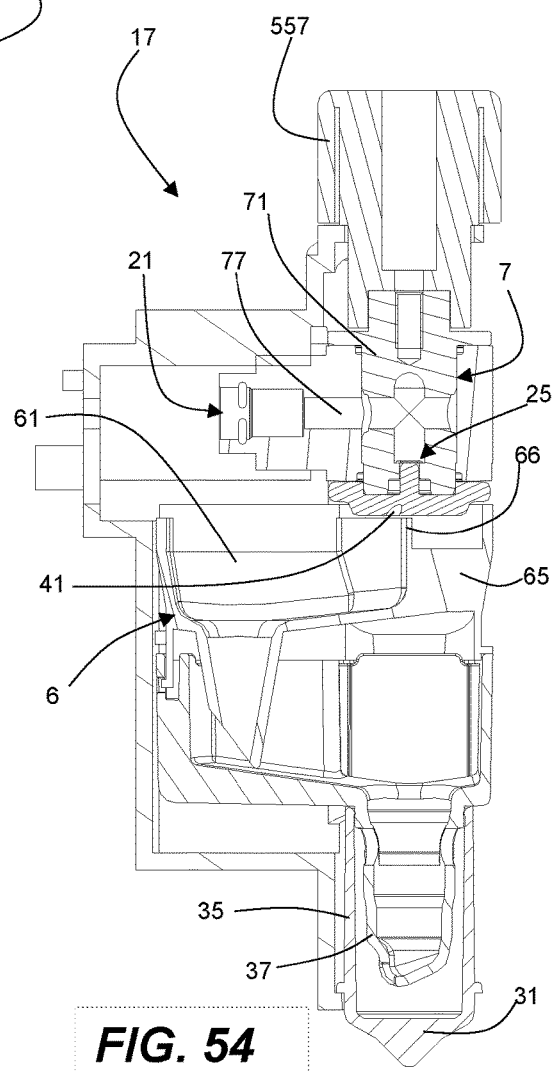
FIG. 54 is a side view of the dispensing unit of FIG. 50, sectioned according to a section line LIV-LIV in FIG. 52.
Figure 55:
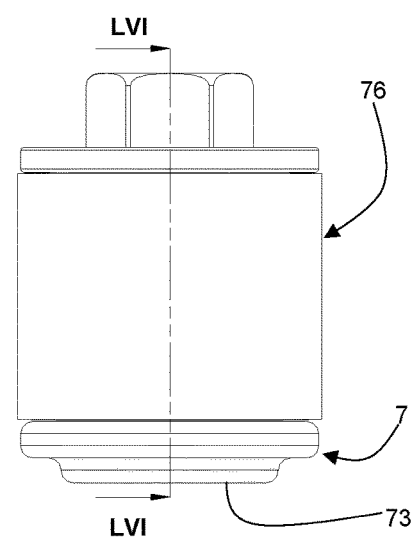
FIG. 55 is a front view of a component of the dispensing unit of FIG. 50.
Figure 56:
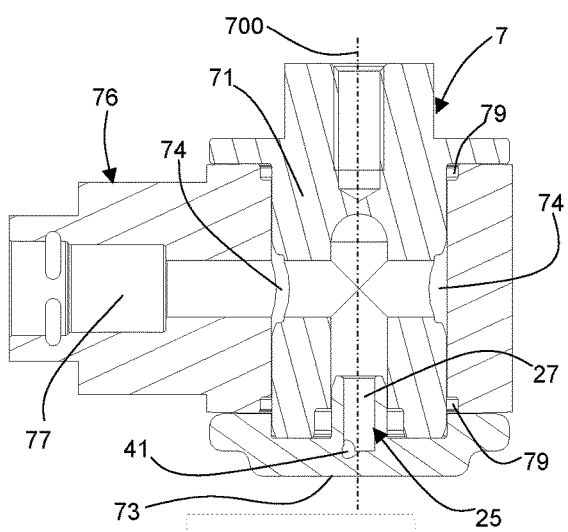
FIG. 56 is a side view of the component of FIG. 55, sectioned according to a section line LVI-LVI.
Figure 57:
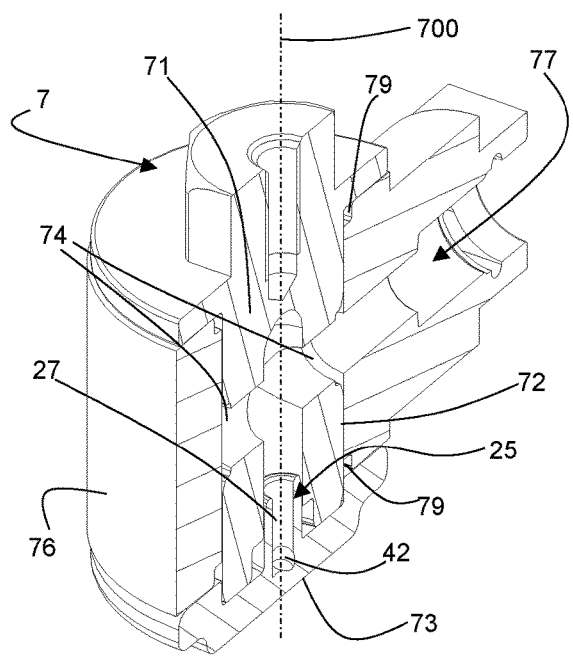
FIG. 57 is an axonometric view of the component of FIG. 55, sectioned according to the section line LVI-LVI.
Figure 58:
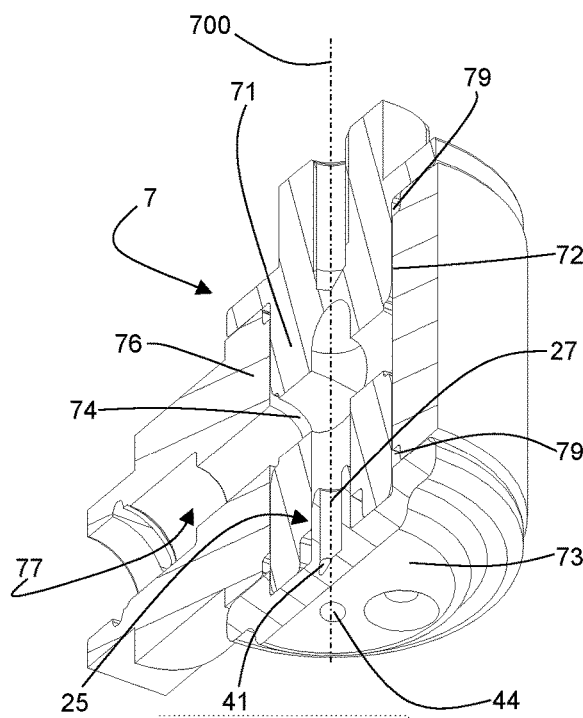
FIG. 58 is another axonometric view of the component of FIG. 55, sectioned according to the section line LVI-LVI.

As shown in particular in FIG. 46, the flow divider 25 comprises two compartments or chambers 251, 252 that are intended to receive the two parts of beverage. Unlike the dispensing unit 13 in which the two ducts 41, 42 are in an inverted V configuration, in the dispensing unit 15 the infeeds 43 of the two ducts 41, 42 are at a distance from each other and mounted at outfeed openings of said two compartments or chambers 251, 252. The flow divider is provided with a partition 253 that separates the flow of beverage arriving into two parts. In this embodiment the flow divider 25 does not comprise calibrated nozzles. Alternatively, a flow divider like that described for the dispensing unit 13 may also be adopted for the dispensing unit 17.

The two ducts 41, 42 are in a converging, V-shaped condition, when the movable member 53 is in the first position (FIGS. 43 to 46), which in particular is a position shifted upwards. The two ducts 41, 42 are substantially parallel, or in any case converge less, when the movable member 53 is in the second position (FIGS. 48 and 49), which in particular is a position shifted downwards.

The ducts 41, 42 are elastically deformable and tend to spontaneously return to the converging condition shown for the first position. Therefore, the two seats 535 are C-shaped and face in opposite directions, that is to say, they are interposed between the two ducts 41, 42.

To constrain the movable member 53 to perform a translating movement along the axis 530, the movable member 53 comprises a slide 539 that slides along tracks 29 made on the body of the dispensing unit 15.

The dispensing unit 15 operating and use methods are similar to what is described above.

It should be noticed that the above-mentioned differences between the dispensing unit 15 and the dispensing unit 13 are substantially not correlated with each other. Therefore, other embodiments are possible in which only some of said differences are present.

A fourth embodiment of a beverage dispensing unit according to this invention is described with reference to FIGS. 50 to 60 and is labelled with the numeral 17.

Unless expressly indicated, the parts that have a structure and function identical or similar to corresponding parts of the embodiments described above are labelled using the same reference characters and are not described again in detail.

The dispensing unit 17 again comprises a box-shaped case or body 2, a front part of which is not illustrated in the figures, so that the internal components can be shown.

The dispensing unit 17 has many features in common with the dispensing unit 1 of the first embodiment, from which it differs mainly as regards the movable member.

Instead of being of the translating type, the movable member 7 of the dispensing unit 17 is rotatable about an axis of rotation 700. Therefore, the shifting of the movable member 7 between the first position and the second position, and vice versa, is a rotation about said axis of rotation 700. In use, the axis of rotation 700 is substantially vertical.

The movable member 7 comprises the two ducts 41, 42, which are made in a body 71 of the movable member 7 and therefore are shiftable rigidly with the movable member 7 during the movement between the first position and the second position, and vice versa. The outfeeds 44 of the two ducts 41, 42 are off centre relative to the axis of rotation 700. Consequently, the rotation of the movable member 7 shifts the outfeeds 44 of the two ducts relative to the three dispensing spouts, in this way changing the liquid transfer path.

Specifically, the body 71 of the movable member 7 comprises a cylindrical wall 72 and a bottom face 73. The cylindrical wall 72 has a central axis that coincides with the axis of rotation 700. The outfeeds 44 of the two ducts are on the bottom face 73 and they face the distributing member 6 below. In particular, the two outfeeds 44 have the same radial distance from the axis 700. That is to say, they are on the same circle.

The outfeeds 44 of the two ducts are not positioned symmetrically relative to the axis 700. Considering a plane containing the axis of rotation 700 and the outfeed 44 of one of the two ducts, the outfeed 44 of the other of the two ducts does not belong to said plane. In particular, the two outfeeds 44 are separated by an angular distance of less than 135°, measuring the angle relative to the axis of rotation 700 (that is to say, with the centre on the axis).

Figure 59:
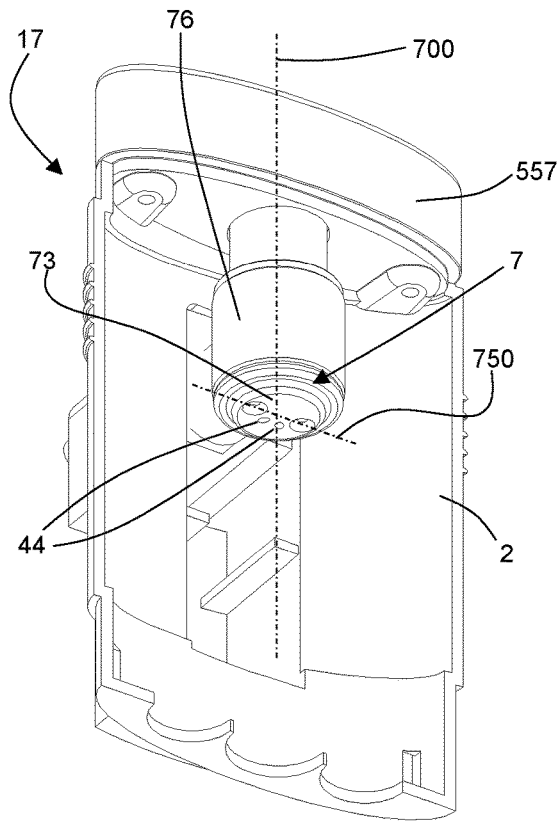
FIG. 59 is an axonometric view of the dispensing unit of FIG. 50 from which several parts have been removed, in a first operating position.
Figure 60:
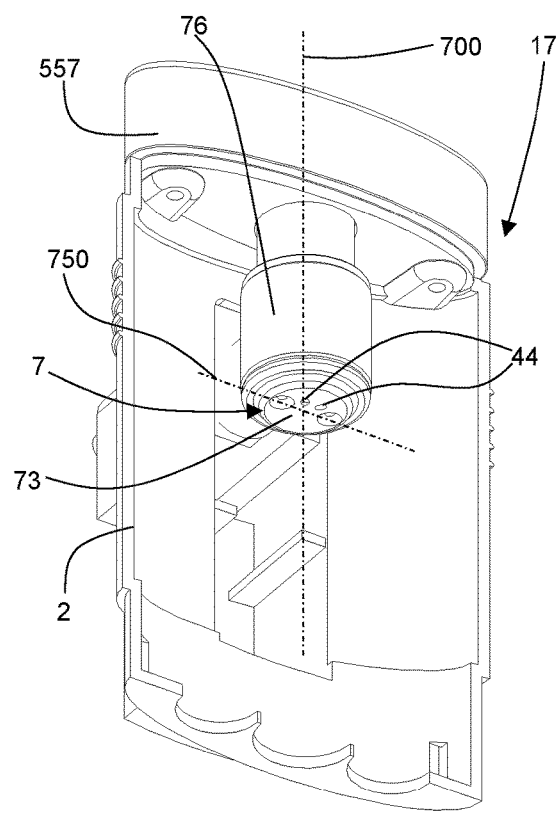
FIG. 60 is an axonometric view of the dispensing unit of FIG. 50, from which several parts have been removed, in a second operating position.

Considering a plane containing the axis 700 and parallel to the front face of the dispensing unit 17 (a trace of that plane is labelled 750), in the first position (shown in FIG. 59)

the two outfeeds 44 are both on one side of the plane 750 and in the second position (shown in FIG. 60) the two outfeeds 44 are both on the other side of the plane 750. The two positions are rotated through 180° relative to one another, about the axis 700.

The distributing member 6 is substantially similar to that described for the dispensing unit 1 according to the first embodiment. In fact, the distributing member 6 comprises three chambers 61, 62, 63 separated from each other by partitions 65, 66 and each communicating with a respective dispensing spout 31, 32, 33. The second chamber 62 is alongside the third chamber 63, whilst the first chamber 61 is offset relative to the second chamber 62 and to the third chamber 63. The three chambers are positioned substantially at the vertices of a triangle in plan view. Basically, the first partition 65 is below the bottom region 73 between the outfeeds 44 when the movable member 7 is in the second position; the second partition 66 is at the plane 750.

When the movable member 7 is in the first position, both outfeeds 44 are positioned above or in the first chamber 61. When the movable member 7 is in the second position, the outfeed 44 of the first duct 41 is positioned above or in the second chamber 62 and the outfeed 44 of the second duct 42 is positioned above or in the third chamber 63. Operation of the dispensing unit 17 is similar to that of the dispensing unit 1, except for the mechanism by means of which the outfeeds 44 are shifted relative to the distributing member 6.

The dispensing unit 17 comprises a rotatable selector 557 that is connected to the movable member 7 and can be operated by a user. In particular, the rotatable selector 557 is at the top of the dispensing unit 17 and is rotates together with the movable member 7. A rotation of the rotatable selector 557 between a first angular position and a second angular position, and vice versa, causes a shifting of the movable member 7 between the first position and the second position, and vice versa.

The dispensing unit 17 also comprises a flow divider 25, which is interposed between the beverage infeed section 21 and the infeeds of the two ducts 41, 42. The flow divider 25 is designed to divide the beverage at infeed into two substantially equal parts that are fed to the two ducts.

Specifically, the flow divider 25 is included in the movable member 7 and comprises an inner chamber 27 intended to receive the beverage and two calibrated nozzles that form outfeed passages from the inner chamber 27. In particular, the calibrated nozzles are the ducts 41, 42. In the particular embodiment illustrated, the inner chamber 27 is made in the body 71 in a position substantially coaxial with the axis 700 and the ducts 41, 42 extend from said inner chamber 27 in such a way that they diverge and they are slanting relative to the axis 700, so that the outfeeds 44 are off centre relative to the axis.

The cylindrical wall 72 of the body 71 comprises two openings 74 that, by means of respective channels made in the self-same body 71, communicate with the inner chamber 27 of the flow divider 25. In particular, the two openings 74 are in diametrically opposed positions. The body 71 is rotatably housed in a support 76 that surrounds the cylindrical wall 72. The support 76 is fixed to the body 2 of the dispensing unit and comprises a channel 77 designed to receive the beverage from the infeed section 21. For example, the channel 77 can be connected to the infusion chamber by a pipe (not illustrated). The channel 77 is open on the cylindrical wall 72.

When the movable member 7 is in the first position or in the second position, one or the other of the openings 74 is in communication with the channel 77. In particular, the rotation of the body 71 about the axis 700 between the first position and the second position alternatively brings a first opening 74 or a second opening 74 into position at the channel 77, in such a way that the beverage in the channel 77 enters the body 71 and the inner chamber 27 of the flow divider 25 in both positions.

The fluidtight seal between the rotatable body 71 and the support 76 is guaranteed by annular gaskets 79.

Again, the dispensing unit 17 comprises decanting members 37 and glass-shaped elements 35, similarly to what has already been described relative to the dispensing unit 1. In particular, the dispensing section 23 of the dispensing unit 17 is substantially identical to the dispensing section 23 of the dispensing unit 1.

Again, the dispensing unit 17 can be disassembled for cleaning or maintenance. In the embodiment just described, the distributing member 6 is stationary relative to the three dispensing spouts and relative to the body of the dispensing unit, whilst the movable member 7 is rotatable relative to the distributing member 6.

In an alternative embodiment, the body 71 containing the ducts 41, 42 could be stationary relative to the body of the dispensing unit, whilst the distributing member 6 could be rotatable (or translating) relative to the body 71. In this case, the movable member would comprise the distributing member 6. If necessary, in a specific variant the dispensing spouts are movable with the distributing member 6.

This invention is useful for providing several important advantages.

In fact, the dispensing unit, the apparatus and the method according to this invention allow a beverage to be dispensed into a single container or into two containers simultaneously, with simple and easy switching between one mode and the other. Moreover, in the case of dispensing into two containers, the two containers receive substantially equal parts of the beverage. That is particularly advantageous in the case of an apparatus for making coffee, even more so if used in a professional context such as in public premises or for a catering business.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A beverage dispensing unit (1; 13; 15; 17) for an apparatus for supplying a beverage, comprising:
   an infeed section (21) for a beverage to be dispensed;
   a beverage dispensing section (23), comprising three dispensing spouts (31, 32, 33);
   two ducts (41, 42) interposed in parallel between the infeed section (21) and the dispensing section (23), each of the two ducts (41, 42) comprising an infeed (43) in liquid transfer communication with the infeed section (21) and an outfeed (44) in liquid transfer communication with the dispensing section (23), each of the two ducts (41, 42) being intended to receive a respective part of the beverage;
   a movable member (5; 53; 7) shiftable between a first position and a second position, and vice versa, the movable member (5; 53; 7) being designed to change a liquid transfer path between the outfeeds (44) of the two ducts (41, 42) and the dispensing section (23), in such a way that:

when the movable member (5; 53; 7) is in the first position, the two ducts (41, 42) are communicating with the dispensing section (23) in such a way that the respective parts of beverage are introduced into a same first one (31) of said three dispensing spouts; and when the movable member (5; 53; 7) is in the second position, the two ducts (41, 42) are communicating with the dispensing section (23) in such a way that the respective part of beverage of one (41) of the two ducts is introduced into a second one (32) of said three dispensing spouts and the respective part of beverage of the other (42) of the two ducts is introduced into a third one (33) of said three dispensing spouts.

2. The beverage dispensing unit (1; 13; 15; 17) according to claim 1, comprising a distributing member (6) interposed between the two ducts (41, 42) and the three dispensing spouts (31, 32, 33), the distributing member (6) comprising three chambers (61, 62, 63) that are separate from each other, each of the three chambers (61, 62, 63) communicating with a respective one of said three dispensing spouts (31, 32, 33), wherein, when the movable member (5; 53; 7) is in the first position, the outfeeds (44) of the two ducts (41, 42) are positioned above or in a first chamber (61) communicating with the first dispensing spout (31), and wherein, when the movable member (5; 53; 7) is in the second position, the outfeeds (44) of the two ducts (41, 42) are positioned above or in a second chamber (62) and a third chamber (63), respectively, the second chamber (62) communicating with the second dispensing spout (32) and the third chamber (63) communicating with the third dispensing spout (33).

3. The beverage dispensing unit (1; 17) according to claim 2, wherein the second chamber (62) is alongside the third chamber (63) and wherein the first chamber (61) is offset relative to the second chamber (62) and to the third chamber (63), the three chambers (61, 62, 63) being positioned substantially at the vertices of a triangle in a plan view.

4. The beverage dispensing unit (1) according to claim 3, wherein the movable member (5; 53) is translating, the movable member (5; 53) being shiftable between the first position and the second position with a movement along an axis of translation (500; 530), and wherein the offset of the first chamber (61) relative to the second chamber (62) and to the third chamber (63) is along a line of offset that is parallel with the axis of translation (500) of the movable member (5), the line of offset and the axis of translation (500) being substantially horizontal in use.

5. The beverage dispensing unit (13; 15) according to claim 2, wherein the two ducts (41, 42) are flexible or bendable, the movable member (53) being designed to bow or bend the two ducts (41, 42) in such a way as to shift the outfeeds (44) of the two ducts (41, 42) relative to the three dispensing spouts (31, 32, 33), thereby changing said liquid transfer path, and wherein the first chamber (61) is interposed between the second chamber (62) and the third chamber (63), the outfeeds (44) of the two ducts (41, 42) being near to each other when the movable member (53) is in the first position, the outfeeds (44) of the two ducts (41, 42) being far from each other when the movable member (53) is in the second position.

6. The beverage dispensing unit (17) according to claim 3, wherein, in use, the distributing member (6) is stationary relative to the three dispensing spouts (31, 32, 33) and the movable member (7) is rotatable relative to the distributing member (6), the shifting between the first position and the second position, and vice versa, being a rotation of 180° about an axis of rotation (700), and wherein, considering a plane containing the axis of rotation (700) and the outfeed (44) of one of the two ducts (41, 42), the outfeed (44) of the other of the two ducts (41, 42) does not belong to said plane.

7. The beverage dispensing unit (1; 13; 15; 17) according to claim 2, wherein, in use, the distributing member (6) is stationary relative to the three dispensing spouts (31, 32, 33) and the outfeeds (44) of the two ducts (41, 42) are shiftable relative to the distributing member (6).

8. The beverage dispensing unit (1; 13; 15; 17) according to claim 1, comprising a flow divider (25) that is interposed between the infeed section (21) and the infeeds (43) of the two ducts (41, 42), the flow divider (25) being designed to divide the beverage at infeed into two substantially equal parts that are fed to the two ducts (41, 42).

9. The beverage dispensing unit (1; 13; 17) according to claim 8, wherein the flow divider (25) comprises an inner chamber (27) intended to receive the beverage and two calibrated nozzles (28) that form outfeed passages from the inner chamber (27).

10. The beverage dispensing unit (1; 17) according to claim 8, wherein the movable member (5; 7) comprises the flow divider (25).

11. The beverage dispensing unit (17) according to claim 10, wherein the movable member (7) is rotatable about an axis of rotation (700), a shifting of the movable member (7) between the first position and the second position, and vice versa, being a rotation about said axis of rotation (700), wherein the movable member (7) comprises a body (71) having a cylindrical wall (72) and a bottom face (73), the flow divider (25) and the two ducts (41, 42) being made in said body (71) and the outfeeds (44) of the two ducts (41, 42) being on said bottom face (73), the cylindrical wall (72) comprising two openings (74) communicating with the inner chamber (27) of the flow divider (25), the body (71) being rotatably housed in a support (76) that surrounds said cylindrical wall (72) and has a channel (77) designed to receive the beverage from the infeed section (21), the channel (77) being open on the cylindrical wall (72), wherein one or the other of said two openings (74) is communicating with said channel (77) when the movable member (7) is in the first position or in the second position.

12. The beverage dispensing unit (1; 13; 15; 17) according to claim 1, wherein the movable member (5; 53; 7) is designed to shift the outfeeds (44) of the two ducts (41, 42) relative to the three dispensing spouts (31, 32, 33), thereby changing said liquid transfer path.

13. The beverage dispensing unit (1; 17) according to claim 12, wherein the movable member (5; 7) comprises the two ducts (41, 42), the two ducts (41, 42) being shiftable rigidly with the movable member (5; 7).

14. The beverage dispensing unit (1; 13; 15) according to claim 1, wherein the movable member (5; 53) is translating, the movable member (5; 53) being shiftable between the first position and the second position with a movement along an axis of translation (500; 530).

15. The beverage dispensing unit (1) according to claim 14, comprising a rotatable selector (55) that can be operated by a user, the rotatable selector (55) being connected to the movable member (5) by an operating screw (57), wherein a rotation of the rotatable selector (55) between a first angular position and a second angular position, and vice versa, causes a shifting of the movable member (5) between the first position and the second position, and vice versa.

16. The beverage dispensing unit (1) according to claim 15, wherein the rotatable selector (55) is shiftable to a third angular position in which the rotatable selector (55) is disconnected from the movable member (5) and is removable from the beverage dispensing unit (1).

17. The beverage dispensing unit (13; 15) according to claim 1, wherein the two ducts (41, 42) are flexible or bendable, the movable member (53) being designed to bow or bend the two ducts (41, 42) in such a way as to shift the outfeeds (44) of the two ducts (41, 42) relative to the three dispensing spouts (31, 32, 33), thereby changing said liquid transfer path.

18. The beverage dispensing unit (13; 15) according to claim 17, wherein the movable member (53) is translating, the movable member (53) being shiftable between the first position and the second position with a movement along an axis of translation (530).

19. The beverage dispensing unit (13; 15) according to claim 18, wherein the movable member (53) comprises two seats (535) that each receive one section of a respective one of said two ducts (41, 42), the two seats (535) being slidable along the two ducts (41, 42) during the translating movement of the movable member (53), the two seats (535) being positioned at a distance from each other and determining a corresponding distance between the sections of the two ducts (41, 42) that are received in the seats (535).

20. The beverage dispensing unit (13; 15) according to claim 18, wherein, in use, the axis of translation (530) is substantially vertical.

21. The beverage dispensing unit (13; 15) according to claim 18, comprising a translating selector (553) that can be operated by a user, the translating selector being connected to the movable member (53), a translation of the translating selector (53) between a first condition and a second condition, and vice versa, causing a shifting of the movable member (53) between the first position and the second position, and vice versa.

22. The beverage dispensing unit (13; 15) according to claim 17, wherein the two ducts (41, 42) are elastically deformable.

23. The beverage dispensing unit (13; 15) according to claim 17, comprising a flow divider (25) that is interposed between the infeed section (21) and the infeeds (43) of the two ducts (41, 42), the flow divider (25) being designed to divide the beverage at infeed into two substantially equal parts that are fed to the two ducts (41, 42).

24. The beverage dispensing unit (13; 15) according to claim 23, wherein the flow divider (25) comprises an inner chamber (27) intended to receive the beverage and two calibrated nozzles (28) that form outfeed passage from the inner chamber (27).

25. The beverage dispensing unit (13) according to claim 24, wherein the infeeds (43) of the two ducts (41, 42) are mounted directly on the two calibrated nozzles (28).

26. The beverage dispensing unit (15) according to claim 23, wherein the flow divider (25) comprises two compartments or chambers (251, 252) intended to receive the two parts of the beverage, the infeeds (43) of the two ducts (41, 42) being positioned at a distance from each other and mounted at outfeed openings from said two compartments or chambers (251, 252).

27. The beverage dispensing unit (17) according to claim 1, wherein the movable member (7) is rotatable about an axis of rotation (700), a shifting of the movable member (7) between the first position and the second position, and vice versa, being a rotation about said axis of rotation (700).

28. The beverage dispensing unit (17) according to claim 27, wherein the movable member (7) comprises the two ducts (41, 42), the outfeeds (44) of the two ducts (41, 42) being off centre relative to said axis of rotation (700) so that the movable member (7) is designed to shift the outfeeds (44) of the two ducts (41, 42) relative to the three dispensing spouts (31, 32, 33), thereby changing said liquid transfer path.

29. The beverage dispensing unit (17) according to claim 28, wherein, considering a plane containing the axis of rotation (700) and the outfeed (44) of one of the two ducts (41, 42), the outfeed (44) of the other of the two ducts (41, 42) does not belong to said plane.

30. The beverage dispensing unit (17) according to claim 29, wherein the outfeeds (44) of the two ducts (41, 42) have the same radial distance from the axis of rotation (700) and, relative to the axis of rotation (700), are separated from each other by an angular distance.

31. The beverage dispensing unit (17) according to claim 14, comprising a rotatable selector (557) that can be operated by a user, the rotatable selector (557) being connected to the movable member (7), a rotation of the rotatable selector (557) between a first angular position and a second angular position, and vice versa, causing a shifting of the movable member (7) between the first position and the second position, and vice versa.

32. The beverage dispensing unit (17) according to claim 14, wherein, in use, the axis of rotation (700) is substantially vertical.

33. The beverage dispensing unit (1; 13; 15; 17) according to claim 1, wherein the three dispensing spouts (31, 32, 33) are positioned alongside one another, the first dispensing spout (31) being in a position interposed between the second dispensing spout (32) and the third dispensing spout (33).

34. The beverage dispensing unit (1; 13; 15; 17) according to claim 1, wherein each dispensing spout (31, 32, 33) is located on a bottom of a respective glass-shaped element (35).

35. The beverage dispensing unit (1; 13; 15; 17) according to claim 34, wherein a respective decanting member (37) is positioned at least partly in each glass-shaped element (35), the decanting member (37) being a hollow body forming an inner cavity (39) and comprising a wall with at least one outfeed hole (390, 391).

36. The beverage dispensing unit (1; 13; 15; 17) according to claim 35, wherein the decanting member (37) comprises at least one first outfeed hole (390) made in a lower region of the inner cavity (39) and at least one second outfeed hole (391) made in an upper region of the inner cavity (39).

37. An apparatus for supplying a beverage, comprising at least one beverage dispensing unit (1; 13; 15; 17) according to claim 1.

38. The apparatus according to claim 37, wherein the apparatus is for supplying coffee.

39. A method for dispensing a beverage, comprising the steps of:
dividing a flow of beverage into two substantially equal parts;
if beverage dispensing into a single container is required, directing the two parts of beverage flow towards a same first dispensing point;
if simultaneous beverage dispensing into two containers is required, directing a first part of the beverage flow towards a second dispensing point and directing a second part of the beverage flow towards a third dispensing point.

* * * * *

UNITED STATES PATENT AND TRADEMARK OFFICE
CERTIFICATE OF CORRECTION

PATENT NO. : 10,820,747 B2  
APPLICATION NO. : 15/769159  
DATED : November 3, 2020  
INVENTOR(S) : Italo Andrea Alvarez Virtoli Page 1 of 1

It is certified that error appears in the above-identified patent and that said Letters Patent is hereby corrected as shown below:

In the Claims

In Column 20, Line 19, being Line 2 of Claim 31, please delete:
"14, comprising a rotatable"
And insert therefor:
-- 27, comprising a rotatable --

In Column 20, Line 27, being Line 2 of Claim 32, please delete:
"14, wherein, in use"
And insert therefor:
-- 27, wherein, in use --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*